(12) United States Patent
Lakshman et al.

(10) Patent No.: US 11,218,729 B2
(45) Date of Patent: Jan. 4, 2022

(54) CODING MULTIVIEW VIDEO

(71) Applicant: Dolby Laboratories Licensing Corporation, San Francisco, CA (US)

(72) Inventors: Haricharan Lakshman, Sunnyvale, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/847,539

(22) Filed: Apr. 13, 2020

(65) Prior Publication Data

US 2020/0244994 A1 Jul. 30, 2020

Related U.S. Application Data

(62) Division of application No. 16/003,070, filed on Jun. 7, 2018, now Pat. No. 10,652,579.

(60) Provisional application No. 62/518,187, filed on Jun. 12, 2017.

(51) Int. Cl.
*H04N 19/597* (2014.01)
*H04N 13/161* (2018.01)
*G06T 15/20* (2011.01)
*G06T 19/00* (2011.01)
*H04N 13/111* (2018.01)

(52) U.S. Cl.
CPC ........... *H04N 19/597* (2014.11); *G06T 15/20* (2013.01); *G06T 19/006* (2013.01); *H04N 13/111* (2018.05); *H04N 13/161* (2018.05)

(58) Field of Classification Search
CPC .. H04N 19/597; H04N 13/111; H04N 13/161; G06T 19/006; G06T 15/20
See application file for complete search history.

(56) References Cited

U.S. PATENT DOCUMENTS

| | | | |
|---|---|---|---|
| 2012/0229602 A1* | 9/2012 | Chen | H04N 19/597 348/43 |
| 2014/0092968 A1* | 4/2014 | Guillemot | H04N 19/597 375/240.14 |
| 2014/0098883 A1 | 4/2014 | Hannuksela | |
| 2015/0201176 A1 | 7/2015 | Graziosi | |
| 2015/0269736 A1* | 9/2015 | Hannuksela | G06T 7/194 345/419 |
| 2016/0191887 A1 | 6/2016 | Casas | |
| 2018/0081178 A1 | 3/2018 | Shpunt | |
| 2018/0176599 A1* | 6/2018 | Park | H04N 19/182 |

(Continued)

OTHER PUBLICATIONS

Ihrke, I. et al "Transparent and Specular Object Reconstruction" Computer Graphics Forum, vol. 29, No. 8 pp. 2400-2426, Nov. 10, 2010.

(Continued)

*Primary Examiner* — Tracy Y. Li

(57) ABSTRACT

A target view to a 3D scene depicted by a multiview image is determined. The multiview image comprises multiple sampled views. Each sampled view comprises multiple texture images and multiple depth images in multiple image layers. The target view is used to select, from the multiple sampled views of the multiview image, sampled views. A texture image and a depth image for each sampled view in the selected sampled views are encoded into a multiview video signal to be transmitted to a downstream device.

16 Claims, 15 Drawing Sheets

(56) References Cited

U.S. PATENT DOCUMENTS

2018/0293752 A1    10/2018  Ninan et al.
2018/0295351 A1    10/2018  Ninan

OTHER PUBLICATIONS

ITU-T H.265 "High Efficiency Video Coding" Series H: Audiovisual and Multimedia Systems, Infrastructure of Audiovisual Services—Coding of Moving Video, Feb. 2018.
Magnor, M. et al "Data Compression for Light-Field Rendering" IEEE Transactions on Circuits and Systems for Video Technology, vol. 10, No. 3, Apr. 2000, pp. 338-343.
Merkle, P. et al "Efficient Prediction Structures for Multiview Video Coding" IEEE Transactions on Circuits and Systems for Video Technology, vol. 17, Issue 11, Oct. 29, 2007, pp. 1461-1473.
Ramanathan, P. et al "Random Access for Compressed Light Fields Using Multiple Representations" IEEE 6th workshop on Multimedia Signal Processing, Italy, Sep. 2004, pp. 383-386.

* cited by examiner

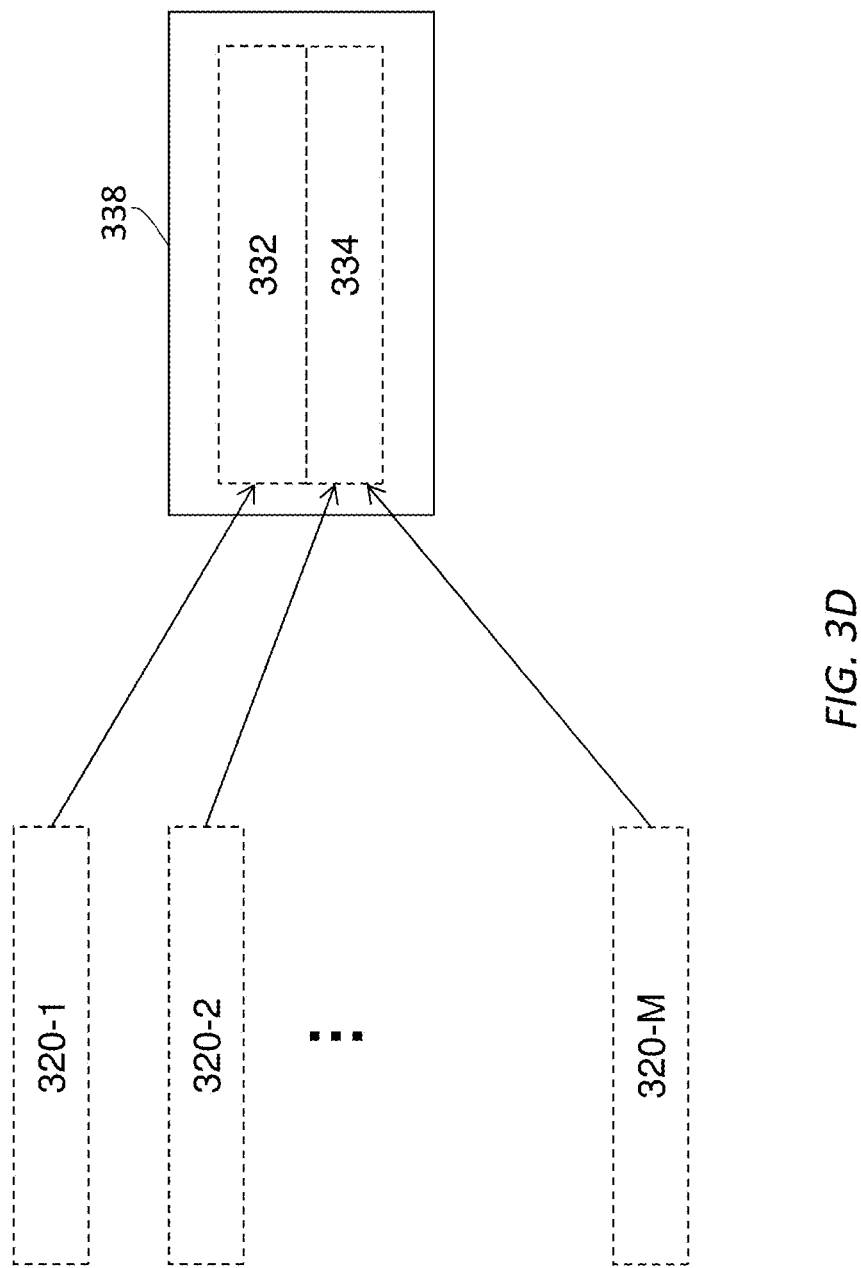

determine a target view to a 3D scene depicted by a multiview image 402 use the target view to select, from sampled views of the multiview image, a set of sampled views 404 encode texture images and depth images in the set of sampled views into a multiview video signal 406

FIG. 4A decode a multiview video signal into a set of texture images and a set of depth images for a set of sampled views of a multiview image 422 warp the set of texture images to a set of warped texture images of a target view 424 blend the set of warped texture images of the target view into a blended warped texture image of the target view 426 cause a display image derived from the blended warped texture image of the target view to be rendered on a display of a wearable device 428

FIG. 4B create a prediction structure for multiview image(s) 442 generate predicted multiview image data portion(s) for the key view(s) 444 generate a predicted multiview image data portion for a current dependent view 446 encode residual multiview image data portion(s) for the key view(s) and a residual multiview image data portion for the current dependent view into a multiview video signal 448

FIG. 4C

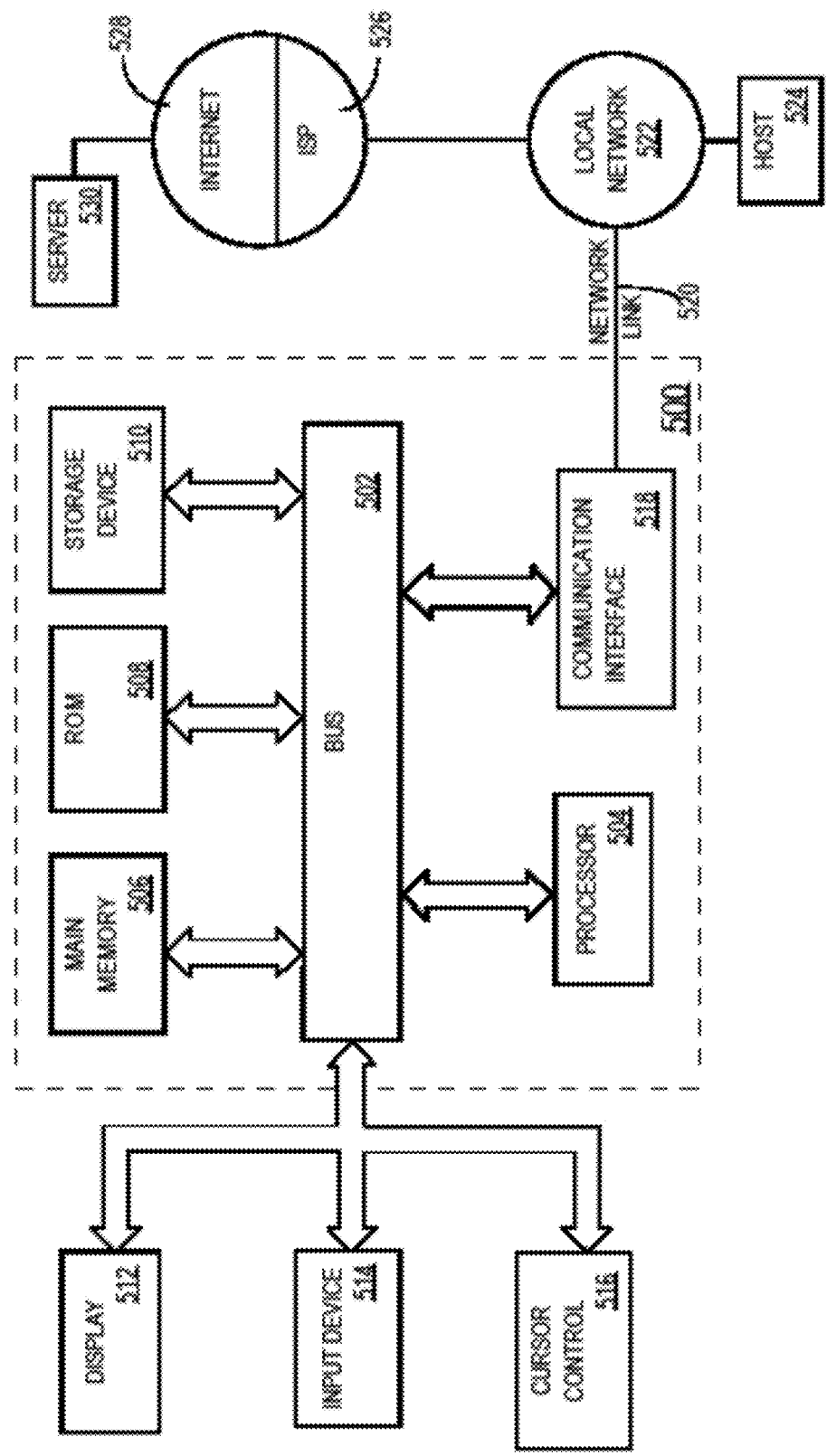

CODING MULTIVIEW VIDEO

CROSS-REFERENCE TO RELATED APPLICATIONS

This application is a divisional application of U.S. patent application Ser. No. 16/003,070 filed on Jun. 7, 2018, which claims priority to U.S. Provisional Patent Application No. 62/518,187, filed Jun. 12, 2017, which is hereby incorporated by reference in its entirety.

BACKGROUND

The present invention relates generally to video images, and in particular, to coding multiview video.

Under some multiview video coding techniques, a one-dimensional (1D) array of single-view images can be used to generate target views along a baseline, for example in autostereoscopic display applications. These techniques support a relatively limited number of video applications such as television image viewing by a viewer who can move horizontally along the baseline. In many other applications, however, a viewer may move viewpoints freely in a spatial area or a spatial volume, not necessarily along any baseline. Thus, a 1D array of single-view images may be insufficient to generate target views of viewpoints away from a baseline and to fill in relatively numerous pixels that are to be disoccluded in these target views.

Under light field (LF) based video coding techniques, image based rendering covering target views can be performed with a two-dimensional (2D) array of textures, if sampled views represented in the 2D array of texture images are sufficiently dense. While redundancy among the texture images can be exploited to an extent, it is still difficult to achieve simultaneously high coding efficiency for and random access in the numerous sampled views. Extending the 2D array to a three-dimensional (3D) viewing volume further entails storing many more sampled views (with high redundancy) in very large data stores. Capturing a sufficiently dense set of sampled views could also be very difficult if not impossible in many scenarios.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3C and FIG. 3D illustrate example signal structures of multiview video signals or bitstreams;

FIG. 4A through FIG. 4D illustrate example process flows; and

FIG. 5 illustrates an example hardware platform on which a computer or a computing device as described herein may be implemented.

DESCRIPTION OF EXAMPLE EMBODIMENTS

Figure 1A:
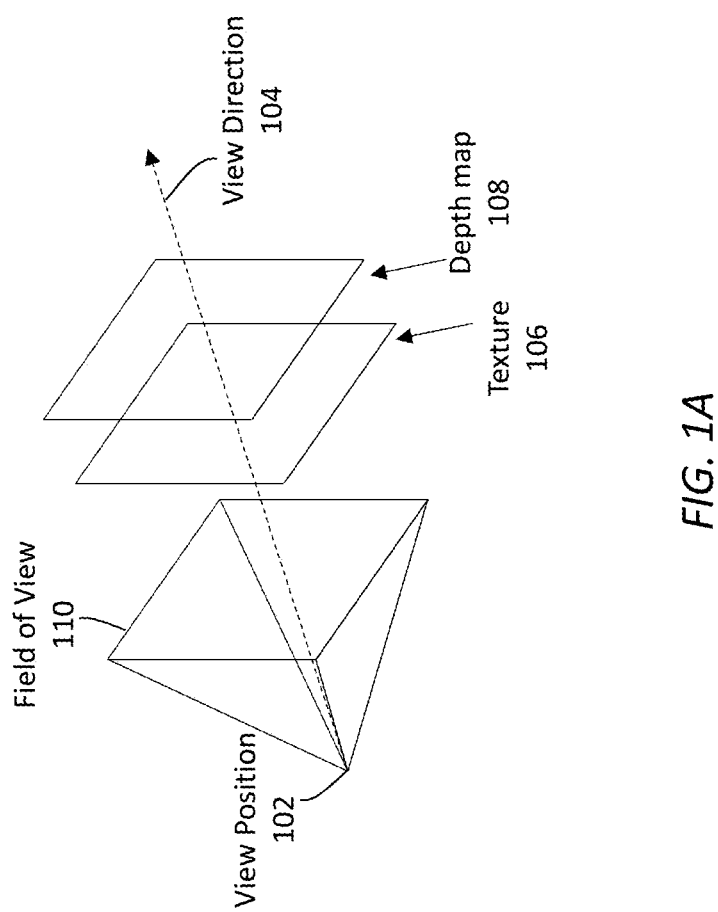
FIG. 1A and FIG. 1B illustrate example sampled views in multiview images.

Example embodiments, which relate to coding multiview video, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. SINGLE-LAYER IMAGE REPRESENTATION
3. MULTI-LAYER IMAGE REPRESENTATION
4. TARGET AND NEIGHBORING SAMPLED VIEWS
5. MULTI-LAYER IMAGE COMPOSITION
6. PREDICTION-STRUCTURE TO SUPPORT RANDOM ACCESS TO VIEWS
7. APPLYING DECAY FACTORS TO SAMPLED VIEWS
8. EXAMPLE MULTIVIEW IMAGE PIPELINE
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

In immersive 3D video applications such as virtual reality (VR) and augmented reality (AR), display images are updated in response to a viewer's head motions to provide immersive and comfortable viewing experiences. In a 2D viewing area or a 3D viewing volume that represents a spatial region, the viewer can freely make head (or body) motions and get correct perspectives to visual objects depicted in a 3D scene (or a 3D image space) with the display images rendered to the viewer.

Light field image-based rendering with densely sampled views can synthesize target views (e.g., novel views, non-sampled views, etc.), and even reproduce correct view dependent effects in the target views. However, capturing a dense light field of texture images could be very difficult or physically impossible in many scenarios, for example due to camera/lens sizes and issues related to fields of views, densities of sampled views, etc.

Relatively sparsely sampled views in conjunction with 3D reconstruction (e.g., computer vision based approaches, etc.) can be used to render the target views, yet reconstructing 3D models for arbitrary dynamic scenes is difficult and tends to be generally error prone.

Techniques as described herein can be used to implement hybrid approaches in which depth images (or depth maps) are used as basic geometry tools (e.g., directly, as a starting point, etc.) to aid image based rendering. These approaches may be referred to as depth image based rendering (DIBR), which involves using both texture images and depth maps for a set of sampled views (for example not necessarily as dense as neighboring sampled views within a single pixel) and employing warping to synthesize texture images of target views (e.g., that are not covered by the set of sampled views, etc.). As used herein, a target view may refer to a viewer's view or viewpoint, at a given time, that can be computed/estimated/determined based on a spatial position and a spatial direction of a wearable device of the viewer at the given time.

A multiview image comprises image data for each sampled view in a plurality of sampled views. A target view may or may not coincide with any of the sampled views supported or covered by the multiview image.

Under some approaches, all sampled views in the plurality of sampled views of the multiview image may be encoded in a video signal to be transmitted to a downstream device operating in conjunction with the wearable device so that the downstream device can make use of all the sampled views of the multiview image to synthesize texture image(s) for the target view. While redundancy among different sampled views may be exploited to compress image data to be encoded in the video signal, these approaches likely increase operational complexity in decoding operations, as the downstream device need to decode a relatively large number of sampled views.

Under techniques as described herein, instead of encoding all the sampled views of the multiview image, neighboring sampled views to the target view can be selected from the plurality of sampled views of the multiview image for the target view that may or may not coincide with any of the sampled views supported by the multiview image.

A variety of prediction methods can be used to provide random access to texture and depth images of the neighboring sampled views with high coding efficiency. These prediction methods may include but are not necessarily limited to only, any of: "INTER" prediction methods based on motion compensated temporal prediction of texture and depth images of the same sampled view but different time instants, "INTRA" prediction methods based on spatial prediction of already decoded image blocks in the same image, "INTER_VIEW" prediction methods based on disparity compensated prediction of already decoded texture and depth images of other sampled views, etc.

These prediction methods can be used individually or in combination to exploit temporal, spatial, and disparity-based redundancy in image data of the multiview image to greatly compress the amount of image data of the neighboring sampled views and other encoded sampled views referenced by the neighboring sampled views that need to be encoded into a video signal.

Additionally, optionally or alternatively, for each sampled view, instead of storing all image details of the sampled view in a single monolithic unlayered image (or image layer), the image details of the sampled view such as diffuse image details, specular image details, etc., may be stored in multiple image layers. Each image layer of the multiple image layers may comprise its own texture image(s), depth image(s), etc. For example, the diffuse image details of the sampled view may be stored in a diffuse image layer that comprises a diffuse texture image and a diffuse depth image. The specular image details of the sampled view may be stored in a specular image layer that comprises a specular texture image and a specular depth image.

A layered scheme as described herein supports reconstructing and rendering diffuse images in the diffuse image layer by a legacy video decoder that may be of a limited dynamic range or limited processing capabilities, as well as reconstructing and rendering overall texture images that contain both specular and diffuse image details from the diffuse and specular texture images in the different image layers by a compliant video decoder that may be of a relatively large dynamic range or relatively expansive processing capabilities.

In each image layer (e.g., the diffuse image layer, the specular image layer, etc.), texture images of a set of neighboring sampled views relative to a target view can be used to generate a set of warped texture images of the target view using depth images of the set of neighboring sampled views; the depth images of the set of neighboring sampled views correspond to the texture images of the set of neighboring sampled views.

The set of warped texture images of the same target view in an image layer can be blended into a blended warped texture image for the image layer. A denser set of neighboring sampled views may be used in an image layer (e.g., the specular image layer, etc.) that is used to capture relatively more view-dependent effects. A less denser set of neighboring sampled views may be used in an image layer (e.g., the diffuse image layer, etc.) that is used to capture relatively less view-dependent effects such as diffuse image details.

Furthermore, multiple blended warped texture images of the target view for the multiple image layers can be composited into a final synthesized texture image of the same target view. The final synthesized texture image of the same target view can be used as, or can be used to derive, a display image to be rendered with a display of the wearable device to the viewer.

Techniques as described herein can bring about a number of benefits including but not necessarily limited to only, any of: ensuring correct handling of specular reflections in the final synthesized view represented by the final synthesized texture image of the same target view; high coding efficiency; random access to arbitrary sampled views in a light field as well as target views that may or may not coincide with the sampled views through image warping, blending and compositing; backward compatibility with legacy video decoders, limited capability video decoders, single layer decoders, etc.; supporting high quality image rendering with multi-layer video decoders and/or adaptive streaming clients; etc.

Techniques as described herein can be used with 3D technologies to provide entertainment experiences. These entertainment experiences may be provided with shared displays such as those related to any of: Dolby 3D, RealD, linear polarization based 3D, circular polarization based 3D, spectral spatial separation based 3D, etc. The entertainment experiences may also be provided with movable device displays such as those related to image projectors on wearable devices, VR displays, AR displays, HoloLens displays, Magic Leap displays, Mixed Reality (MR) displays, tensor displays, volumetric displays, light field (LF) displays, Immy displays, Meta displays, etc. Example wearable devices and device displays can be found in U.S. patent application Ser. No. 15/945,237, with an application title of "AUGMENTED 3D ENTERTAINMENT SYSTEMS" by Ajit Ninan and Neil Mammen, filed on Apr. 4, 2018, the entire contents of which are hereby incorporated by reference as if fully set forth herein.

These techniques can be used to support real time video applications, near-real-time video applications, non-real-time video applications, VR applications, AR applications, remote presence applications, automobile entertainment applications, helmet mounted display applications, heads up display applications, games, 2D display applications, 3D display applications, multiview display applications, etc.

Example embodiments described herein relate to encoding multiview video signals. A target view to a 3D scene depicted by a multiview image is determined. The multiview image comprises a plurality of sampled views. Each sampled view of the multiview image comprises a plurality of texture images and a plurality of depth images in a plurality of image layers. Each sampled view of the multiview image comprises a texture image in the plurality of texture images and a depth image in the plurality of depth images for each image layer in the plurality of image layers. The target view is used to select, from the plurality of sampled views of the multiview image, a set of sampled views. Each sampled view in the plurality of sampled views corresponding to a respective viewpoint to the 3D scene. A texture image and a depth image for each sampled view in the set of sampled views are encoded into a multiview video signal to be transmitted to a downstream device.

Example embodiments described herein relate to decoding multiview video signals. A multiview video signal is decoded into a set of texture images and a set of depth images for a set of sampled views of a multiview image. Each sampled view in the set of sampled views corresponds to a respective viewpoint in a set of viewpoints to a 3D scene. The set of texture images is warped to a set of warped texture images of a target view based on the set of depth images. The set of warped texture images of the target view is blended into a blended warped texture image of the target view. A display image derived at least in part from the blended warped texture image of the target view is caused to be rendered on a display of a wearable device.

Example embodiments described herein relate to using prediction methods to encode multiview video signals. A prediction structure is created for one or more multiview images each of which comprises multiview image data for a plurality of sampled views. The prediction structure designates one or more sampled views in the plurality of sampled views as one or more key views, and all remaining sampled views in the plurality of sampled views as dependent views. A predicted multiview image data portion is generated for a key view in the prediction structure based INTRA prediction (based on spatial prediction referring to reconstructed samples of the same key view and the same time instant), or INTER prediction (based on motion compensated temporal prediction referring to one or more previously reconstructed reference pictures of the same key view but different time instant), or INTER_VIEW prediction (based on disparity compensated prediction referring to one or more reconstructed pictures of other key views but same time instant). A predicted multiview image data portion is generated for a dependent view in the prediction structure based on spatial INTRA prediction (based on spatial prediction referring to one or more reconstructed samples of the same dependent view and the same time instant), or INTER_VIEW prediction (based on disparity compensated prediction referring to one or more reconstructed pictures of key views and the same time instant). INTER prediction is not used for dependent views. Also, a dependent view is not used as a reference for INTER_VIEW prediction. The residual multiview image data portion for the one or more key views and a residual multiview image data portion for the dependent view are encoded into a multiview video signal to be transmitted to a downstream device. The residual multiview image data portion is generated based on the predicted multiview image data portion and the original multiview image data portion.

Example embodiments described herein relate to using prediction methods to decode multiview video signals. A multiview video signal is decoded into one or more multiview image data portions of one or more residual multiview images for one or more key views in a prediction structure and a residual multiview image data portion for a dependent view in the prediction structure. The residual multiview image data portion has been generated based on a predicted multiview image data portion and an original multiview image data portion of the one or more multiview images. The one or more key views and the dependent view belong to a plurality of sampled views of one or more multiview images. The predicted multiview image data portion for the dependent view is generated based on the one or more multiview image data portions of the one or more multiview images for the one or more key views. The multiview image data portion of the one or more multiview images is generated based on the predicted multiview image data portion and the residual multiview image data portion. One or more display images derived at least in part from the multiview image data portion of the one or more multiview images for the dependent view are caused to be rendered on a display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Single-Layer Image Representation

FIG. 1A illustrates an example sampled view of a multiview image. The sampled view can be represented by a view (origin) position 102 and a view direction 104 (e.g., a spatial direction of the wearable device, etc.). The view position (102) and the view direction (104) of the sampled view may be deemed to be equivalent to a spatial position and a spatial direction, respectively, of a wearable device used by a viewer, if the wearable device happens to take the same viewpoint as that of the sampled view to a 3D scene (or a 3D image space).

As used herein, the term "sampled view" refers to a view, to a 3D scene or a 3D image space, for which the multiview image contains image data of the 3D scene or the 3D image space as seen from a viewpoint represented by a view position and a view direction (of the viewer). In contrast, the term "target view" refers to a view, to a 3D scene or a 3D image space, for which the multiview image may or may not contain image data of the 3D scene or the 3D image space as seen from a viewpoint represented by a view position and a view direction (of the viewer). In embodiments in which the multiview image comprises image data for only a set of relatively sparse sampled views, it is likely that the multiview image does not comprise image data for the target view of the viewer at many if not all time instants in a plurality of time instants evenly or unevenly distributed over a video application session.

The multiview image may comprise a plurality of sampled views. Each sampled view in the plurality of sampled views in the multiview image may correspond to a viewpoint represented by a respective combination of a specific view position and a specific view direction among different combinations of individual view positions and individual view directions. View positions in the plurality of sampled views in the multiview image may be constrained to be within a 1D baseline or curve, a 2D viewing area, a 3D viewing volume, etc. View directions in the plurality of sampled views in the multiview image may span anywhere from a relatively small individual solid angle to up to a full sphere (e.g., omnidirectional, 4π steradians, etc.).

The multiview image may comprise image data of the plurality of sampled views in the form of a plurality of single-view texture images and a plurality of depth maps that corresponds to the plurality of single-view texture images, respectively. In some embodiments, image data of a sampled view comprises a single-view texture image in the plurality of single-view texture images and a corresponding single-view depth image in the plurality of single-view depth images. The single-view texture image represents texture image data of visual objects in the 3D scene (or the 3D image space) as seen from the viewpoint of the sampled view, whereas the corresponding single-view depth image represents depth data of the visual objects in the 3D scene (or the 3D image space) as seen or measured from the viewpoint (e.g., the view position (102), etc.) of the sampled view.

For example, as illustrated, image data of the sample view of FIG. 1A comprises a single-view texture image 106 in the plurality of single-view texture images and a corresponding single-view depth image 108 in the plurality of single-view depth images.

Additionally, optionally or alternatively, a sampled view in the plurality of sampled views in the multiview image may be represented by additional parameters such as a field of view with the viewpoint of the sampled view, a certain spatial shape, an aspect ratio, etc. For example, as illustrated, the sampled view of FIG. 1A may be (additionally, optionally or alternatively) represented by a field of view 110. In some embodiments, the single-view texture image 106 and the single-view depth image 108 contain sufficiently large numbers of pixels (e.g., texture image pixels, depth image pixels, etc.) to cover (e.g., entirely, a salient part of, a focus region of, etc.) the field of view (110).

Under other approaches that do not implement the techniques as described herein, 3D scenes depicting virtual objects caused by specular, glossy, semi-transparent, or mirroring surfaces are frequently not handled well. Appearances of these virtual objects in reflections can be highly dependent on, or highly specific to, particular views (e.g., particular viewpoints, particular combinations of view positions and view directions, particular view positions, particular view directions, etc.) to the 3D scenes. These other approaches may not reproduce view dependent effects in specular reflections correctly. If the view dependent effects are not handled well in a VR or AR application, it can lead to a loss of immersion in user experiences.

The texture image (106) can be warped, based on the depth image (108), into a warped texture image for a target view that is not covered by any sampled view of the multiview image. By way of illustration, the texture image (106) may depict a specular surface (e.g., of a car, of an airplane, etc.) that causes specular reflections that are highly view dependent.

In cases where the texture image (106) does not contain image data that depicts visual effects such as bright reflections of relatively small sizes from the specular surface, the warped image for the target view is likely not to depict such visual effects. Thus, when the viewer makes head motions from one view to another view, no visual effects such as natural reflections of relatively small sizes from the specular surface can be seen, contrary to ordinary visual experiences in which appearances of reflections from a specular surface or object are relatively random and highly view dependent. This likely leads to a loss of a sense of immersion in user experiences for a VR or AR application.

Conversely, in cases where the texture image (106) does contain image data that depicts the bright reflections of relatively small sizes from the specular surface, the warped image for the target view is likely to also depict such visual effects. Thus, when the viewer makes head motions from one view to another view, the bright reflections of relatively small sizes from the specular surface can persistently and invariably be seen, contrary to ordinary visual experiences in the real world. This also likely leads to a loss of the sense of immersion in user experiences for the VR or AR application.

3. Multi-Layer Image Representation

Under techniques as described herein, a sampled view (e.g., each sampled view, etc.) of a multiview image can be represented in a (e.g., logical, physical, etc.) multi-layer representation. In some embodiments, the sampled view of the multiview image in the multi-layer representation comprises a plurality of image layers, each of which includes a texture image and a corresponding depth map.

Figure 1B:
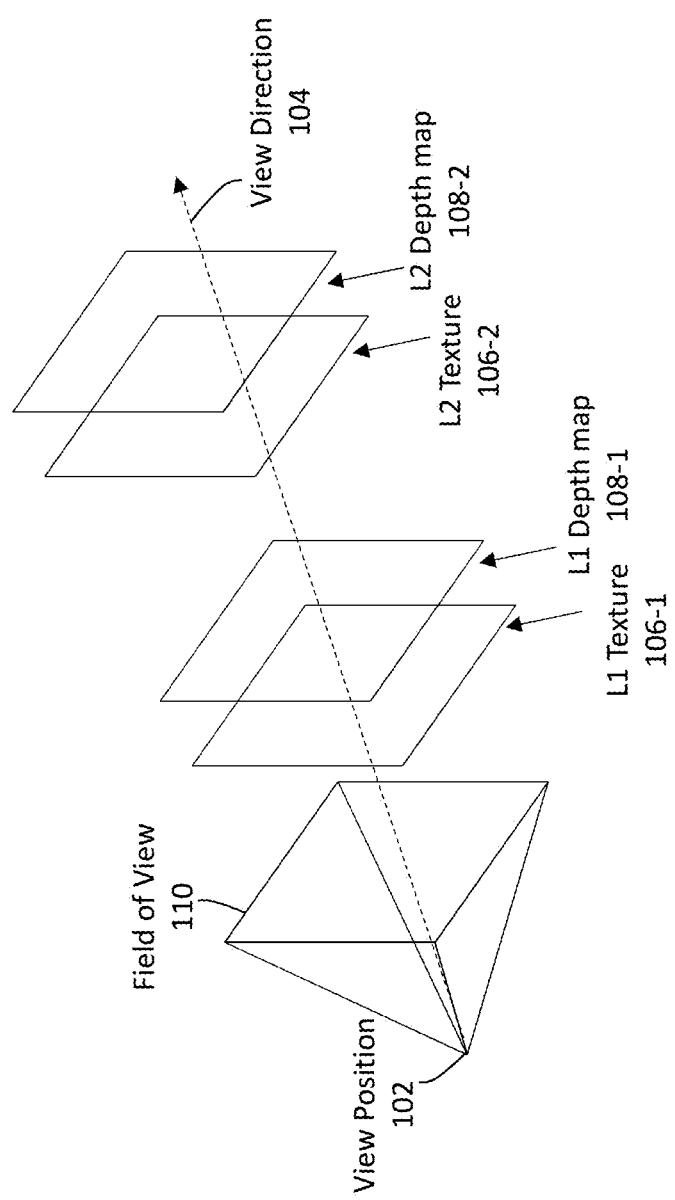

FIG. 1B illustrates an example multi-layer representation of a sampled view in a multiview image. By way of illustration, the sampled view can be represented by the viewpoint comprising the view position (102) and the view direction (104).

The multiview image may comprise image data of the plurality of sampled views. Image data of each sampled view in the plurality of sampled views is represented by a plurality of image layers. Each image layer in the plurality of image layers comprises a single-view texture image and a single-view depth image corresponding to the single-view texture image. In some embodiments, the plurality of image layers for the sampled view comprises a diffuse image layer (denoted as "L1") and a specular image layer (denoted as "L2"). The diffuse image layer may be used to depict image details of the diffuse component of the sampled view in the multiview image, whereas the specular image layer may be used to depict image details of the specular or glossy component of the sampled view in the multiview image. Additionally, optionally or alternatively, in various embodiments, the plurality of image layers may comprise zero, one or more other image layers in addition to the diffuse and specular image layers.

A diffuse texture image 106-1 (denoted as "L1 texture") in the diffuse image layer ("L1") comprises texture image data of diffuse visual objects in the 3D scene (or the 3D image space) as seen from the sampled view, whereas a corresponding diffuse depth image 108-1 (denoted as "L1 depth") in the diffuse image layer ("L1") comprises depth data of the diffuse visual objects in the 3D scene (or the 3D image space) as seen or measured from the sampled view.

A specular texture image 106-2 (denoted as "L2 texture") in the specular image layer ("L2") comprises texture image data of specular visual objects in the 3D scene (or the 3D image space) as seen from the sampled view, whereas a corresponding specular depth image 108-2 (denoted as "L2 depth") in the specular image layer ("L2") comprises depth data of the specular visual objects in the 3D scene (or the 3D image space) as seen or measured from the sampled view.

In some embodiments, specular reflections (in the specular texture image (106-2)) can be deemed or modeled as virtual (or imaginary) objects appearing in the specular reflection at depths (in the specular depth image (108-2)) different from that of a reflecting/specular surface that causes the specular reflections.

4. Target and Neighboring Sampled Views

Figure 2A:
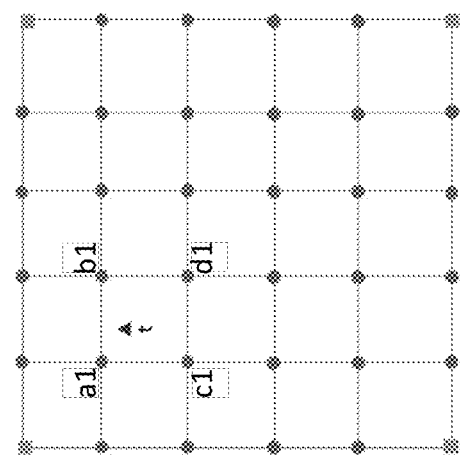
FIG. 2A and FIG. 2B illustrate example discretization of a light field of a 3D scene based on sampled views covered by single-view images.

FIG. 2A illustrates an example discretization of a light field of a 3D scene based on sampled views covered by single-view images of the diffuse image layer ("L1") in one or more multiview images (e.g., in a sequence of multiview images of the 3D scene, etc.). In various embodiments, the light field of the 3D scene at a given time instant may be arbitrarily sampled (e.g., over a 2D viewing area, a 3D viewing volume, etc.) into a multiview image that comprises a plurality of sampled views at the given time instant. The plurality of sampled views in the multiview image corresponds to a plurality of viewpoints, or a plurality of combinations of different view positions and different view directions.

Without loss of generality, as illustrated in FIG. 2A, the plurality of sampled views in the multiview image may be represented as a discrete distribution of points (or vertexes) in a uniform grid. Each point in the discrete distribution represents a corresponding sampled view and comprises a combination of a corresponding view position and a corresponding view direction. View positions covered by the plurality of sampled views may be distributed over a 2D viewing area, a 3D viewing volume, etc., up to an entire venue in a multiview video experience (e.g., for VR experience, for AR experience, etc.). View directions covered by the plurality of sampled views may cover one or more solid angles up to a full sphere.

It should be noted that in various embodiments, the plurality of sampled views in the multiview image may or may not be represented with a uniform grid as illustrated in FIG. 2A. In some embodiments, the plurality of sampled views may be represented by a discrete distribution of points in a non-uniform grid. Each point in the discrete distribution in the non-uniform grid represents a corresponding sampled view and comprises a combination of a corresponding view position and a corresponding view direction. In some embodiments, the plurality of sampled views may be represented by a spherical discrete distribution of points. Each point in the spherical discrete distribution represents a corresponding sampled view and comprises a combination of a corresponding view position and a corresponding view direction.

Thus, in some embodiments, view positions covered by the plurality of sampled views (or viewpoints) in the multiview image may or may not be spatially uniformly distributed. For example, denser view positions may be distributed at one or more central/paracentral/salient regions, than at other regions (e.g., in periphery, etc.), in the 2D viewing area, the 3D viewing volume, etc. View directions covered by the plurality of sampled views in the multiview image may or may not be spatially uniformly distributed in solid angle(s). For example, denser view directions may be distributed at one or more central/paracentral/salient directions, than at other directions, in the one or more solid angles.

Let "t" denote a target view to be synthesized from the plurality of sampled views in the multiview image. In some embodiments, a viewpoint corresponding to the target view at a given time may be determined as a combination of a specific spatial position (or a view position) and a specific spatial direction (or a view direction) of a wearable device, at the given time. The wearable device may operate with a display on which a display image (e.g., a stereoscopic image, a pair of left and right images, etc.) comprising image data of the target view derived from the multiview image is to be rendered, for example within a fraction of an image refresh interval or a strict delay following the given time.

A downstream device (e.g., a VR client device, an AR client device, a video decoder, etc.) operating in conjunction with the wearable device can determine the view position and the view direction of the target view in real time or in near real time by tracking or monitoring spatial positions and/or spatial directions of the wearable device used by the viewer while display images including the display image derived from the multiview image are rendered on the display of the wearable device to the viewer.

In some embodiments, the view position and the view direction of the viewpoint corresponding to the target view (or device tracking data used to determine/identify the view position and the view direction) may be signaled/provided to by the downstream device to an upstream device (e.g., a VR server, an AR server, a video encoder, etc.) that has access to the plurality of sampled views in the multiview image.

Depending on the view position and the view direction in the target view "t", the upstream device can identify a first set of neighboring sampled views for the diffuse image layer ("L1"), denoted as {"a1," "b1," "c1," "d1"} in FIG. 2A, from among the plurality of sampled views in the multiview image.

L1 texture images and L1 depth images for the neighboring sampled views for the diffuse image layer ("L1") can be used to construct a L1 texture image (denoted as "L1_t") of the target view. The neighboring sampled views in the first set of neighboring sampled views for the diffuse image layer ("L1") may be selected based on one or more selection factors (e.g., selection factors general to all image layers, selection factors specific to the diffuse image layer, etc.), including but not necessarily limited to only, one or more of: proximity of view positions of the neighboring sampled views relative to the view position of the target view, proximity of view directions of the neighboring sampled views relative to the view direction of the target view, weighted or unweighted combinations of the foregoing, etc.

The upstream device can retrieve/access the L1 texture images and the L1 depth maps for the neighboring sampled views, and transmit the L1 texture images and the L1 depth maps for the first set of neighboring sampled views to a downstream recipient device. The first set of the neighboring sampled views, or the L1 texture images and the L1 depth images therein, can be encoded as a part of a multiview video signal (e.g., a multiview multi-layer video signal, a multiview single-layer video signal, etc.) and transmitted by the upstream device to the downstream device.

The downstream device receives the multiview video signal and decodes the L1 texture images and the L1 depth images from the multiview video signal. The decoded L1 texture images of the neighboring sampled views {"a1", "b1", "c1", "d1"} are warped to L1 texture images "L1_t" of the target view "t" using the corresponding decoded L1 depth maps. For example, the decoded L1 texture image of the neighboring sampled view "a1" is warped to an L1 texture image of the target view "t" using the decoded L1 depth image of the neighboring sampled view "a1".

As used herein, the term "warp" or "warping" refers to spatial transformations (e.g., translations, rotations, scaling, etc.) based on a depth map performed on a corresponding texture image of a first view (e.g., a sampled view, etc.) to generate a texture image of a second view (e.g., a target view, etc.). The spatial transformations from the first view to the second view can be generated based at least in part on the view position and the view direction of the first view and the view position and the view direction of the second view. For example, a translation in the spatial transformations may be represented or generated as a vector representing a linear displacement between the view position of the first view and the view position of the second view. A rotation in the spatial transformations may be represented or generated as a matrix representing an angular displacement (e.g., yaw, pitch, roll, etc.) between the view direction of the first view and the view direction of the second view. A visual object (or any pixel thereof) depicted in the texture image of the first view may be transformed (including but not limited to the foregoing spatial transformation and scaling caused by different distances to different view positions) into a visual object depicted in the texture image of the second view based on the depth of the visual object (or any pixel thereof) indicated in the depth image of the first view and the spatial transformations.

In some embodiments, the L1 texture images of the target view as warped from the L1 texture images of the neighboring sampled views are blended by the downstream device to generate the L1 texture image "L1_t" of the target view.

Additionally, optionally or alternatively, at least some of the L1 texture image "L1_t" of the target view can be generated by rendering from a 3D model, in addition to or instead of based on depth image based rendering as described above.

Figure 2B:
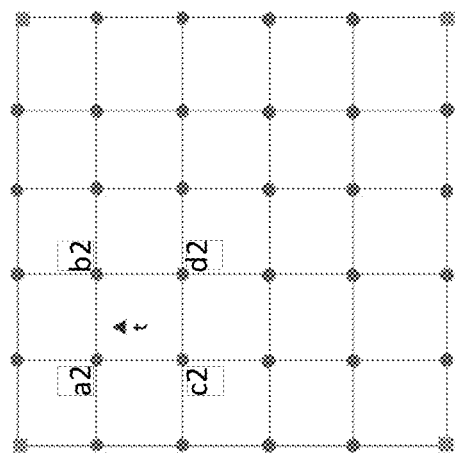

FIG. 2B illustrates an example discretization of the light field of the 3D scene based on sampled views covered by single-view images of the specular image layer ("L2") in the one or more multiview images (e.g., in the sequence of multiview images of the 3D scene, etc.). As illustrated, depending on the view position and the view direction in the target view "t", the upstream device can identify a second set of neighboring sampled views for the specular image layer ("L2"), denoted as {"a2", "b2", "c2", "d"}, from among the plurality of sampled views in the multiview image.

L2 texture images and L2 depth images for the neighboring sampled views for the specular image layer ("L2") can be used to construct a L2 texture image (denoted as "L2_t") of the target view. The neighboring sampled views in the second set of neighboring sampled views for the specular image layer ("L2") may be selected based on one or more selection factors (e.g., selection factors general to all image layers, selection factors specific to the specular image layer, etc.), including but not necessarily limited to only, one or more of: proximity of view positions of the neighboring sampled views relative to the view position of the target view, proximity of view directions of the neighboring sampled views relative to the view direction of the target view, weighted or unweighted combinations of the foregoing, etc.

The upstream device can retrieve/access the L2 texture images and the L2 depth maps for the neighboring sampled views, and transmit the L2 texture images and the L2 depth maps for the second set of neighboring sampled views to the downstream recipient device. The second set of the neighboring sampled views, or the L2 texture images and the L2 depth images therein, can be encoded as a part of the multiview video signal and transmitted by the upstream device separately or along with the L1 texture images and L1 depth images as discussed above to the downstream device.

The downstream device decodes the L2 texture images and the L2 depth images from the multiview video signal. The decoded L2 texture images of the neighboring sampled views {"a2", "b2", "c2", "d2"} are warped to L2 texture images of the target view "t" using the corresponding decoded L2 depth maps. For example, the decoded L2 texture image of the neighboring sampled view "a2" is warped to an L2 texture image of the target view "t" using the decoded L2 depth image of the neighboring sampled view "a2".

The L2 texture images of the target view warped from the L2 texture images of the neighboring sampled views are blended by the downstream device to generate the L2 texture image "L2_t" of the target view.

Additionally, optionally or alternatively, in some embodiments, at least some of the L2 texture image "L2_t" of the target view can be generated by rendering from a 3D model, in addition to or instead of based on depth image based rendering as described above.

In some embodiments, the same set of neighboring sampled views is used for constructing/generating (or warping to) both the L1 texture image "L1_t" and the L2 texture image "L2_t" of the target view. Thus, sampled views in the first set of neighboring sampled views for the diffuse image layer may be the same as (e.g., with 1-1 correspondence, etc.) sampled views the second set of neighboring sampled views for the specular image layer.

In some other embodiments, the set of neighboring sampled views for constructing/generating (or warping to) the L1 texture image "L1_t" of the target view is different from the set of neighboring sampled views for constructing/generating the L2 texture image "L2_t" of the same target view. Thus, the first set of neighboring sampled views for the diffuse image layer may be the same as the second set of neighboring sampled views for the specular image layer. Thus, sampled views in the first set of neighboring sampled views for the diffuse image layer may be different from sampled views in the second set of neighboring sampled views for the specular image layer, for example in terms of the total numbers of sampled views, view positions, view directions, etc.

For example, the first set of neighboring sampled views for constructing/generating (or warping to) the L1 texture image "L1_t" of the target view can be selected based on weight factor values that emphasize proximity between the view positions of sampled views in relation to the view position of the target view, whereas the second set of neighboring sampled views for constructing/generating (or warping to) the L2 texture image "L2_t" of the target view can be selected based on weight factor values that emphasize proximity between the view directions of sampled views in relation to the view direction of the target view.

In some embodiments, the first set of neighboring sampled views for constructing/generating (or warping to) the L1 texture image "L1_t" of the target view contains fewer or more sampled views than those in the second set of neighboring sampled views for constructing/generating (or warping to) the L2 texture image "L2_t" of the target view. For example, the second set of neighboring sampled views for constructing/generating the L2 texture image "L2_t" of the target view can be relatively denser in terms of view positions and/or view directions than the first set of neighboring sampled views for constructing/generating the L1 texture image "L1_t" of the target view.

Specular reflections typically constitute relatively small and relatively few image portions in the field of view (110) than other image portions such as those containing diffuse parts. In some embodiment, a texture image as described herein may or may not comprise all (valid) pixel values for all pixels in an image frame.

For example, each L2 texture images in the specular image layer (or the second set of the neighboring sampled views for constructing/generating the L2 texture image "L2_t") can contain no or few pixel values for the other image portions such as those containing diffuse parts, and thus can be compressed to a relatively great extent in video encoding. Thus, even in cases where the specular image layer contains a relative dense distribution of sampled views around the target view as compared with the diffuse image layer, image data in the L2 texture images and the L2 depth images in the specular image layer can still be compressed into a relatively small total amount.

In some scenarios in which incident light is reflected by a shiny object, the specular reflection could appear only in certain viewing directions and fall off quickly in other viewing directions. The relatively dense distribution of sampled views in the specular image layer can be used to capture rapidly changing view-dependent effects such as those related to specular reflections. As the viewer moves the head from one view to another view, the bright reflections of relatively small sizes from the specular surface could be seen or not seen dependent on specific view positions and/or view directions of the viewer, consistent with ordinary visual experiences. This leads to an enhancement of the sense of immersion in user experiences for a VR or AR application.

The L1 texture images and the L1 depth images in the diffuse image layer (or the first set of sampled views for constructing/generating the L1 texture image "L1_t") contain image data that is likely to be of a relatively limited dynamic range as compared with texture images that contain both L1 and L2 texture image data, after image portions comprising highlight portions and/or specular reflections are captured in the L2 texture images in the specular image layer.

Furthermore, the L1 texture images and the L1 depth images in the diffuse image layer may contain relatively high correlations between pixel values, since the diffuse parts depicted in the L1 texture images and the L1 depth images are less view-dependent and random than the specular reflections.

Thus, even in cases where the diffuse image layer contains sampled views of relatively numerous pixels around the view direction of the target view, image data in the L1 texture images and the L1 depth images in the diffuse image layer can still be compressed into a relatively small total amount, as in the case of the image data in the specular image layer.

Because the image data in both the diffuse image layer and the specular image layer can be efficiently compressed into relatively small total amounts respectively, this leads to an increase of coding efficiency in encoding, decoding or transmitting image data in a multi-layer representation as described herein in a wide variety of display applications including but not limited to a VR or AR application.

In some embodiments, a blending operation/function as described herein can be used to perform weighted averaging of warped texture pixel values at a given warped pixel (position) of an overall warped image such as the L1 texture image "L1_t", L2 texture image "L2_t", etc., from different individual warped texture images. Such weighted averaging may be performed using different weights for different individual warped texture images generated by warping individual single-view images of sampled views. These different weights for the different warped texture images may be set based at least in part on one or more of: individual pre-warped depth values of pre-warped pixels, individual warped depth values of the warped pixel after the pre-warped pixels are warped to the warped pixel, etc. Here, the pre-warped pixels refer to pixels in the single-view images of the neighboring sampled views before these pre-warped pixels are warped into the warped pixel. The different weights for the different individual warped texture images based on the depth values may be used to account for visibility (e.g., disocclusion, occlusion, disocclusion in part, etc.) of the pre-warped pixels in their respective single-view images of the neighboring sampled views, for visibility (e.g., disocclusion, occlusion, disocclusion in part, etc.) of the warped pixel in the warped image such as the L1 texture image "L1_t", the L2 texture image "L2_t", etc., of the target view, etc.

By way of example, blending operations may be weighted (e.g., equal or unequal weighted, etc.) or unweighted (e.g., equal weights, etc.). Different weights may be assigned to different images with different linear and/or angular distances. Closer neighboring sampled views may be assigned higher weights in blending operations, whereas more distant neighboring sampled views may be assigned lower weights in the blending operations. Different weights may be assigned to different images and/or different image portions with different peak-signal-to-noise-ratios (PSNRs) Images or image portions with higher PSNRs may be assigned higher weights in blending operations as these images or image portions may be likely to contain more image details (e.g., higher spatial frequency content, etc.), whereas images or image portions with lower PSNRs may be assigned lower weights in the blending operations as these images or image portions may be likely to contain less image details (e.g., less spatial frequency content, etc.). Different weights may be assigned to different images or image portions with different depths Images or image portions with closer depths relative to the viewer may be assigned higher weights in blending operations as these images or image portions may be less likely to be occluded, whereas images or image portions with more distant depths relative to the viewer may be assigned lower weights in the blending operations as these images or image portions may be more likely to be occluded.

5. Multi-Layer Image Composition

The L1 texture image "L1_t" and the L2 texture image "L2_t" of the same target view "t", as generated by warping images of the neighboring sampled views and by blending the resultant warped images, can be composited by the downstream device into an overall composited image C (a display image for rendering), using any combination of one or more composition methods. In some embodiments, a compositor function is used for composing the L1 texture image "L1_t" and the L2 texture image "L2_t" of the target view "t" into the composited image C, as shown in the following expression:

$$C=f(L1\_t, L2\_t) \quad (1)$$

where f ( . . . ) denotes the compositor function operating on L1_t and L2_t to produce the composited image C.

Pixel values of the composited image C may be derived from pixel values of texture images of the multiple image layers in a variety of compositing operations. A pixel value of the composited image C may be derived from a pixel value of one of the texture images of the multiple image layers. A pixel value of the composited image C may be derived from a weighted or unweighted combination of pixel values of some or all of the texture images of the multiple image layers. In some embodiments, characteristics and/or properties of an image portion may be used to composite pixel values from different image layers. For example, an image portion that depicts a translucent window may combine contributions of pixel values from both of the diffuse image layer and the specular image layer in order to show both specular reflections by the translucent window and diffuse image details behind the translucent window. In some embodiments, depths of an image portion may be used to composite pixel values from different image layers. For example, different weights may be assigned to different depths in compositing operations. Furthermore, a depth cut off may be implemented so that only image portions up to a certain depth threshold are allowed to make contributions into pixel values of the composited image C.

In some embodiments, the compositor function f ( . . . ) in expression (1) above may be given as the right-hand-side (RHS) of the following expression:

$$C=\text{OETF}(\text{EOTF}(L1\_t)+\text{EOTF}(L2\_t)) \quad (2)$$

where OETF represents an optical-to-electric transfer function; and the EOTF represents an electric-to-optical transfer function corresponds to the OETF. It should be noted that, in various embodiments, a combination of one or more functions in a variety of forms of non-linear or linear mapping functions, optical transfer functions, perceptual quantization functions, hybrid log gamma (HLG) functions, gamma-based functions, electric transfer functions, etc., may be used in the compositor function C ( . . . ) in expression (1). For example, instead of the OETF function as illustrated in expression (2), an inverse EOTF function, an OOTF function, etc., may be used as the outer function of the RHS in expression (2) above, whereas a different electric transfer function may be used as the inner functions of the RHS in expression (2).

By way of example but not limitation, each of the L1 texture image "L1_t" and the L2 texture image "L2_t" of the target view "t" comprises non-linear codeword values (e.g., in a non-linear domain, in a non-linear color space, in a non-linear codeword space, etc.). In some embodiments, the non-linear codeword values represent or scale with quanta (e.g., just noticeable difference or JND, etc.) of visual perception of the human visual system in a non-linear RGB color space, a non-linear YCbCr color space, a non-linear IPT color space, a non-linear LMS color space, etc. The non-linear codeword values may be used to emphasize or preserve perceptual contrasts and/or perceptual chromaticity in certain portions of light levels (e.g., mid-tone, etc.), and may not represent additive physical quantities such as linear light levels, light intensities, etc.

In some embodiments, the EOTF in expression (2) above may be applied to the non-linear codeword values in each of the L1 texture image "L1_t" and the L2 texture image "L2_t" of the target view "t" to convert the non-linear codeword values into linear codeword values such as linear light levels or linear intensities in different color components of a linear color space such as a linear RGB color space, a linear YCbCr color space, a linear IPT color space, a linear LMS color space, etc. The linear codeword values may represent or linearly scale with physical light levels (e.g., in candelas per meter squared or nits, etc.) in the color components of the linear color space.

Codeword values of the L1 texture image "L1_t" and the L2 texture image "L2_t" of the target view "t" may be combined based on a composition operation into composited (overall) codeword values based on any combination of one or more codeword composition methods. The composition operation may be, but is not necessarily limited to only, an addition operation as illustrated in expression (2).

For example, as illustrated in expression (2), the linear codeword values of the L1 texture image "L1_t" and the L2 texture image "L2_t" of the target view "t", as generated by applying the EOTF to the non-linear codeword values of the L1 texture image "L1_t" and the L2 texture image "L2_t" of the target view "t", may be added to generate the composited codeword values.

In some embodiments, different weight values can be assigned to one or more different image layers in the composition operation (e.g., addition, non-addition, etc.) instead of giving equal weights to the different image layers.

Additionally, optionally or alternatively, other operations (e.g., arithmetic operations, logic operations, operations based on functions, exponent-based operations, logarithm-based operations, operations depending on specific image portions in the images, operations across all image portions in the images, etc.) in addition to or instead of the illustrated addition operation may be used to generate the composited codeword values as described herein.

In some embodiments, the downstream device (e.g., a display device, a video streaming client, a media player, a wearable device, a set-top box, etc.) is configured to support processing non-linear codeword values in received images. In cases where the composited codeword values, as generated by the composition operation, are linear codeword values, the composited codeword values can be converted by a mapping function such as the OETF as illustrated in expression (2) into non-linear codeword values in a non-linear color space supported by the downstream device.

In some embodiments, a compositor function as described herein may use gamma-based mapping functions instead of or in addition to perceptual-quantization based mapping functions. For example, the OETF function in expression (2)

may be a gamma compression function (e.g., an inverse power function, etc.) based on a gamma factor g, whereas the EOTF function in expression (2) may be a gamma expansion function—which may be logically inverse to the gamma compression function—based on the same gamma factor g.

An example of the compositor function f ( . . . ) in expression (1) using gamma-based mapping functions may be given in the RHS of the following expression:

$$C=(L1\_t\hat{}g+L2\_t\hat{}g)\hat{}1/g \qquad (3)$$

where "^" denotes exponentiation; "^g" represents a gamma expansion function (or EOTF); "^1/g" represents a gamma compression function (or OETF).

By way of example but not limitation, each of the L1 texture image "L1_t" and the L2 texture image "L2_t" of the target view "t" comprises (non-linear) gamma-based codeword values (e.g., in a gamma-based domain, in a gamma-based color space, in a gamma-based codeword space, etc.). In some embodiments, the gamma-based codeword values may be used to emphasize or preserve contrasts and/or chromaticity in certain portions of light levels (e.g., midtone, etc.), and may not represent additive physical quantities such as linear light levels, light intensities, etc.

In some embodiments, the gamma expansion function "^g" in expression (3) above may be applied to the gamma-based codeword values in each of the L1 texture image "L1_t" and the L2 texture image "L2_t" of the target view "t" to convert the gamma-based codeword values into linear codeword values such as linear light levels or linear intensities in different color components of a linear color space such as a linear RGB color space, a linear YCbCr color space, a linear IPT color space, a linear LMS color space, etc. The linear codeword values may represent or linearly scale with physical light levels (e.g., in candelas per meter squared or nits, etc.) in the color components of the linear color space.

Linear codeword values of the L1 texture image "L1_t" and the L2 texture image "L2_t" of the target view "t" may be combined based on a composition operation into composited (overall) codeword values based on any combination of one or more codeword composition methods. The composition operation may be, but is not necessarily limited to only, an addition operation as illustrated in expression (3).

For example, as illustrated in expression (3), the linear codeword values of the L1 texture image "L1_t" and the L2 texture image "L2_t" of the target view "t", as generated by applying the gamma expansion function "^g" to the gamma-based codeword values of the L1 texture image "L1_t" and the L2 texture image "L2_t" of the target view "t", may be added to generate the composited codeword values.

In some embodiments, different weight values can be assigned to one or more different image layers in the composition operation (e.g., addition, non-addition, etc.) instead of giving equal weights to the different image layers.

Additionally, optionally or alternatively, other operations (e.g., arithmetic operations, logic operations, operations based on functions, exponent-based operations, logarithm-based operations, operations depending on specific image portions in the images, operations across all image portions in the images, etc.) in addition to or instead of the illustrated addition operation may be used to generate the composited codeword values as described herein.

In some embodiments, the downstream device (e.g., a display device, a video streaming client, a media player, a wearable device, a set-top box, etc.) is configured to support processing gamma-based codeword values in received images. In cases where the composited codeword values, as generated by the composition operation, are linear codeword values, the composited codeword values can be converted by a gamma-based mapping function such as the gamma compression function "^1/g" as illustrated in expression (3) into gamma-based codeword values in a gamma-based color space supported by the downstream device.

To generate an overall texture image for the target view "t", sampled views in the plurality of sampled views of the multiview image are selected based on the target view "t". Thus, the upstream device need to be able to access specific sampled views (or a specific proper subset) in the plurality of sampled views based on the target view "t", which may be only known at runtime.

6. Prediction-Structure to Support Random Access to Views

Encoding each sampled view independent of other sampled view would enable randomly accessing any sampled view but would not exploit correlation between views, hence resulting in low compression efficiency. On the other hand, using already coded views to predict the current view to be coded would increase the compression efficiency at the expense of random access, which would necessitate decoding all the required reference views just to reconstruct a single view. Techniques as described herein can be used to enable random access to sampled views in the plurality of sampled views of the multiview image and to target views through the sampled views while maintaining relatively high coding efficiency. In some embodiments, a prediction structure may be used by the upstream device. The prediction structure may use a combination of one or more (e.g., pixel-based, block-based, a macroblock-based, a sub-macroblock-based, frame-based, view-based, etc.) prediction methods operating in a variety of prediction modes.

In some embodiments, a plurality of prediction modes (e.g., candidate prediction modes, etc.) may be available for encoding or decoding a block in a texture image, a depth image, etc., for a (e.g., current, etc.) sampled view.

By way of example but not limitation, the plurality of prediction modes may include an "INTRA" prediction mode in which image data of a block can be predicted (or compressed) based on spatial prediction (or one or more spatial prediction methods) from neighboring (e.g., timewise concurrent, etc.) blocks in a (e.g., spatial, causal, etc.) neighborhood within the same texture image of the same sampled view.

In some embodiments, the plurality of prediction modes includes an "INTER" prediction mode in which the image data of the block can be predicted (or compressed) based on motion compensated prediction (or one or more motion compensated prediction methods) from already reconstructed/decoded pictures (or reference pictures) corresponding to different time instants (or different time points) of the same sampled view.

In some embodiments, the plurality of prediction modes includes an "INTER_VIEW" prediction mode in which the image data of the block can be predicted (or compressed) based on disparity compensated prediction (or one or more disparity compensated prediction methods) from already reconstructed/decoded pictures (or reference pictures) of other sampled views corresponding to the same time instant (or the same time point) as the current sampled view.

Figure 2C:
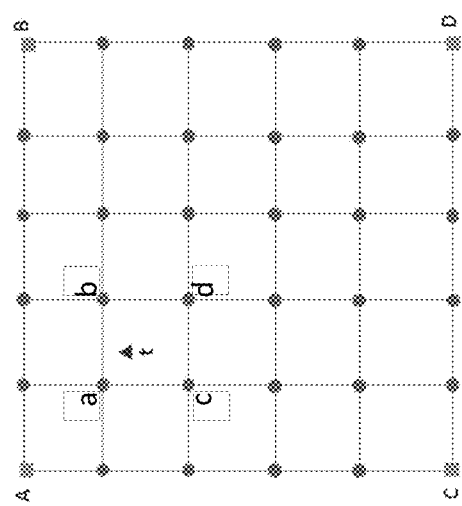
FIG. 2C and FIG. 2D illustrate example prediction structures for sampled views in a multiview image.

FIG. 2C illustrates an example prediction structure for the plurality of sampled views in the multiview image. In some embodiments, every sampled view in the plurality of sampled views is classified as either a "key" view or a "dependent" view.

As used herein, a key or dependent view may be defined based on what restrictions on prediction modes available for prediction (or compression) applicable to such a view. In some embodiments, a key view corresponds to a designated sampled view (e.g., "A", "B", "C", "D", etc.) in the plurality of sampled views over a plurality of time instants (or a plurality of time points) spanning some or all parts of a user session of the VR or AR application. Key views in a plurality of multiview images including the multiview image in the present example can be predesignated, or designated without dependence on any specific target views as determined for given time instants at runtime. Thus, a key view can be designated in the plurality of sampled views in the multiview image regardless of what the target view (e.g., "t", etc.) is at a specific given time instant at runtime.

In some embodiments, at least one key view is defined/designated for a given multiview image. In other words, at least one sampled view in the plurality of sampled views of the given multiview image is designated as a key view. In some embodiments, multiple key views are defined/designated for a given multiview image. Some or all of the multiple key views can be used to predict (or compress) image data in dependent views (or non-key views) in the plurality of sampled views of the given multiview image.

The total number of key views and a spatial distribution of the key views over different combinations of spatial locations and spatial directions may be implementation specific.

Generally speaking, the more the key views are designated, the higher the upfront encoding and decoding costs for images of the key views are for video encoding and decoding operations. On the other hand, the more the key views, the more images of the key views are available for predicting (or compressing) images of the dependent views (e.g., especially those dependent views near the key views), and thus the less the image data that need to be carried in the dependent views.

Images (e.g., texture images, depth images, etc.) of the key views (or the designated sample views) over the plurality of time instants are denoted as key view images. An image block (e.g., a texture image block, a depth image block, etc.) in a key view image may be predicted based on any of the plurality of available prediction modes such as any of the "INTRA", "INTER", "INTER-VIEW", etc. As used herein, an image block may refer to a set of contiguous pixels (e.g., 2×2 pixel block, 4×4 pixel block, 8×8 pixel block, 16×16 pixel block, etc.) in an image (or image frame) up to covering the entire image (or the entire image frame).

By way of comparison, a dependent view corresponds to a sampled view in the plurality of sampled views over the plurality of time instants other than the key views (e.g., "A", "B", "C", "D", etc.). Images (e.g., texture images, depth images, etc.) of a dependent view over the plurality of time instants are denoted as dependent view images.

In some embodiments, in the prediction structure as described herein, an image block (e.g., a texture image block, a depth image block, etc.) in a dependent view image may be predicted based on the "INTRA" and "INTER-VIEW" prediction modes but not the "INTER" prediction mode. This is to enable the dependent views can be decoded at any time instant without the need for previous pictures of the same view, thus enabling random access in time.

In some embodiments, an image block in the (current) dependent view image does not refer to a dependent view image in case of the "INTER_VIEW" prediction mode in order to avoid accessing another dependent view of the same time instant.

Given that the viewer may frequently change view positions and/or view directions, at the preceding or succeeding time instants, target views as determined based on the viewer's view positions and/or view direction may be from the (current) target view "t" at the current time instant. As a result, if the prediction methods in the "INTER_VIEW" prediction mode are to make reference to the reference pictures (or the decoded pictures) of the preceding or succeeding time instants, these reference pictures (or the decoded pictures), which may have been invalidated by the current target view "t", may be of little prediction (compression) values for the dependent image of the (current) target view "t" at the current time instant.

To decode the current dependent view image in the "INTER" prediction mode, attempts would have to be made to fetch additional reference pictures that are other than the (current) decoded pictures and that are of valid sampled views to which the dependent image of the (current) target view "t" at the current time instant can validly refer in the prediction methods. In addition, these additional reference pictures could still refer to earlier reference pictures. Thus, fetching of these additional reference pictures in the "INTER" prediction mode for the current dependent view image may need to be made. This process of continually going back temporally to retrieve referred images for the current target view may become an open loop.

As a result, in cases where the current target view "t" frequently invalidate reference pictures (or decoded pictures) of other time instants, encoding costs, transmission costs and decoding costs may dramatically increase to a point that could cause visual defects such as slow transition, poor image quality, etc., to occur.

Therefore, in some embodiments, a reference picture used in the "INTER_VIEW" prediction mode for a dependent view image may not itself be a dependent view image. In some embodiments, an image block in the (current) dependent view image is not permitted to refer to a dependent view image in case of the "INTER_VIEW" prediction mode.

Additionally, optionally or alternatively, a decoding order can be used in prediction modes as described herein to decode or establish the key views in precedence (or in priority) over the dependent views in order to maximize coding efficiency (or prediction/compression efficiencies). In some embodiments, images (texture or depth images in the multiview image) in the key views of any given time instant are guaranteed to be encoded by the upstream device into the multiview video signal bitstream and to be decoded by the downstream device, regardless of where the target view is at the given time. Therefore, the images in the key views are guaranteed to be available. These images in the key views can be encoded and decoded based on any of "INTER", "INTRA" and even "INTER_VIEW" (e.g., in relation to another key view, etc.) prediction methods. For example, images in a key view can be encoded or decoded with a hierarchical structure. An image in the key view at a given time may be generated at least in part based on motion-compensated temporal prediction from reference images (e.g., I frames, B frames, preceding frames, succeeding frames, etc.) that have been decoded in the hierarchical structure.

In some embodiments, multiple key views (e.g., two key views, three key views, four corner key views A, B, C and D as illustrated in FIG. 2C, etc.) may be designated. The more the key views, the more accurate the prediction of dependent views based on the "INTER_VIEW" prediction methods; thus, the less the image data is to be encoded or decoded for the dependent views.

Figure 2D:
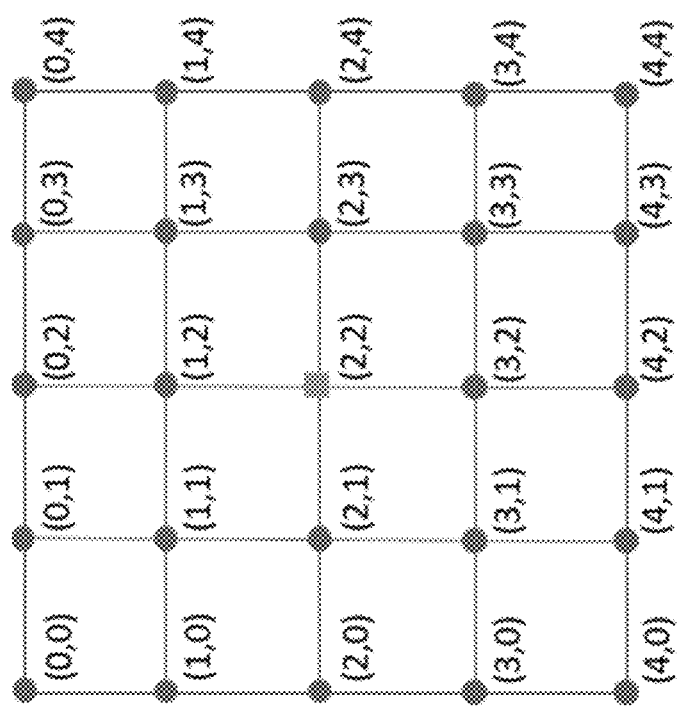

In some embodiments, a single key view (e.g., a center key view (2, 2) as illustrated in FIG. 2D, etc.) may be designated. This reduces image data to be encoded or decoded for the key view. However, the prediction of dependent views would be less accurate than otherwise. As a result, the amount of image data to be encoded or decoded for the dependent views would increase. To encode or decode a key view using "INTER" prediction methods, an image of the key view for a given time instant may refer to either preceding or succeeding images of the same key view for other time instants.

By way of illustration but not limitation, one or more sampled views such as {"A", "B", "C", "D"}, as illustrated in FIG. 2C, in the plurality of sampled views of the multiview image are designated as key views. The remaining sampled views in the plurality of sampled views of the multiview image other than the key views are dependent views.

To synthesize the target view "t", texture images and depth images of the key views {"A", "B", "C", "D"} and a set of neighboring sampled views {"a", "b", "c", "d"}, which in the present example are all dependent views, are decoded.

In some embodiments, some or all of the key views {"A", "B", "C", "D"} are decoded before the set of neighboring sampled views {"a", "b", "c", "d"}. An image block of a texture or depth image of a key view (e.g., "A", "B", "C", "D", etc.) can be decoded with or without prediction. Additionally, optionally or alternatively, in cases where prediction is used, an image block of a texture or depth image of a key view (e.g., "A", "B", "C", "D", etc.) can be predicted based on any of the "INFRA", "INTER" and "INTER_VIEW" prediction modes.

An image block of a texture or depth image of a dependent view (e.g., "a", "b", "c", "d", etc.) can be decoded with or without prediction. Additionally, optionally or alternatively, in cases where prediction is used, an image block of a texture or depth image of a dependent view (e.g., "a", "b", "c", "d", etc.) can be predicted based on either the "INTRA" or the "INTER_VIEW" prediction mode.

Further, in case of the "INTER_VIEW" prediction mode, the image block of the texture or depth image of the dependent view (e.g., "a", "b", "c", "d", etc.) can be predicted using texture or depth images of some or all of the key views {"A", "B", "C", "D"}.

The decoded texture images of the sample views {"a", "b", "c", "d"} are warped to the target view "t" using their corresponding decoded depth images of the sample views {"a", "b", "c", "d"}. Warped texture images of the target view "t", as generated from warping the decoded texture images of the sample views {"a", "b", "c", "d"}, can be blended to generate a texture image (e.g., the L1 texture image "L1_t", the L2 texture image "L2_t", etc.) of the target view "t".

As the texture images and/or the depth images are (e.g., all, mostly, more than a minimum number, etc.) available for key views or the designated sampled views among the plurality of sampled views supported in the multiview images, the texture images and/or the depth images can be randomly accessed (e.g., decoded, predicted, etc.) without incurring much loss in coding efficiency for any of the dependent views (or the non-designated sampled views) among the plurality of sampled views supported in the multiview images.

FIG. 2D illustrates an example prediction structure for the plurality of sampled views in the multiview image. In some embodiments, sampled views in the plurality of sampled views are represented in a 2D array, and indexed by corresponding rows and columns. For example, each sampled view in the plurality of sampled views is indexed by a corresponding row and a corresponding column.

It should be noted that in various embodiments the plurality of sampled views may be represented by various spatial constructs including but not limited to only a 2D spatial structure (e.g., a 2D array of FIG. 2D, etc.). For example, in some embodiments, the plurality of sampled views may be represented by a 3D spatial construct.

Additionally, optionally or alternatively, more or few dimensions may be used in a spatial construct to host or represent a spatial distribution of the plurality of sampled views in the multiview image. For example, up to six dimensions (e.g., three linear/translational dimensions plus three angular/rotational dimensions, etc.) may be used to represent a viewing volume with various viewing directions; each of the up-to-six-dimensions may correspond to a degree of freedom of a wearable device of the viewer.

TABLE 1 illustrates example target views (as illustrated in FIG. 2D) at a plurality of time instants and sampled views (as illustrated in FIG. 2D) from which texture and depth images are warped/blended into texture and depth images of corresponding target views:

TABLE 1

| Time instants | Target Views | Decoded Dependent Views |
| --- | --- | --- |
| 1 | (2.5, 2.5) | (2, 3), (3, 2), (3, 3) |
| 2 | (2.5, 2) | (3, 2) |
| 3 | (3.2, 3.7) | (3, 3), (3, 4), (4, 3), (4, 4) |
| 4 | (2, 2) | — |

By way of illustration but not limitation, let a (e.g., center, focus, etc.) sampled view (2, 2) in the plurality of sampled views as illustrated in FIG. 2D be a key view and the rest of sampled views in the plurality of sampled views be dependent views. In some embodiments, the sampled view (2, 2) is decoded independent of the target view position (or independent of target views monitored/tracked at runtime).

At the first time instant (1), the viewer's view position and view direction is represented by a first target view (2.5, 2.5) of FIG. 2D. Based on the first target view (2.5, 2.5), a first proper subset of sampled views may be selected from the plurality of sampled views of a first multiview image indexed by the first time instant (1). The first proper subset of sampled views comprises the key view (2, 2), and a first subset of dependent views (2, 3), (3, 2) and (3, 3) as indicated in TABLE 1.

Texture and/or depth images (e.g., L1 texture images, L2 texture images, L1 depth images, L2 depth images, unlayered texture images, unlayered depth images) of the key view of the first time instant (1) may be predicted (or compressed) in relation to some or all of (available) reference pictures/images (or decoded pictures/images) using some or all of "INTRA", "INTER", and "INTER_VIEW" prediction methods. Appropriate restrictions arising due to the number of key views can be applied: e.g., in this specific case, since there is only one key view (2, 2), "INTER_VIEW" prediction is not used.

The texture and/or depth images of the key view of the first time instant (1) may be decoded before texture and/or depth images of any dependent views (e.g., the first subset of dependent views (2, 3), (3, 2) and (3, 3) for the first time instant (1), etc.) of the same first time instant (1).

Texture and/or depth images of any dependent view in the first subset of dependent views (2, 3), (3, 2) and (3, 3) of the first time instant (1) may be predicted (or compressed) in relation to some or all of (available) reference pictures/images (or decoded pictures/images) using "INTRA" and "INTER_VIEW" prediction methods, but not "INTER" prediction methods.

In cases where "INTER_VIEW" prediction methods are used to predict image data in a dependent view in the first subset of dependent views (2, 3), (3, 2) and (3, 3) for the first time instant (1), the dependent view does not refer to another dependent view (e.g., at current, preceding or succeeding time instant, etc.).

At the second time instant (2) (e.g., immediately following the first time instant (1), etc.), the viewer's view position and view direction is represented by a second target view (2.5, 2) of FIG. 2D. Based on the second target view (2.5, 2), a second proper subset of sampled views may be selected from the plurality of sampled views of a second multiview image indexed by the second time instant (2). The second proper subset of sampled views comprises the key view (2, 2), and a second subset of dependent views (3, 2) as indicated in TABLE 1.

Texture and/or depth images (e.g., L1 texture images, L2 texture images, L1 depth images, L2 depth images, unlayered texture images, unlayered depth images) of the key view of the second time instant (2) may be predicted (or compressed) in relation to some or all of (available) reference pictures/images (or decoded pictures/images) using some or all of "INTRA", "INTER", and "INTER_VIEW" prediction methods.

The texture and/or depth images of the key view of the second time instant (2) may be decoded before texture and/or depth images of any dependent views (e.g., the second subset of dependent views (3, 2) for the second time instant (2), etc.) of the same second time instant (2).

Texture and/or depth images of any dependent view in the second subset of dependent views (3, 2) of the second time instant (2) may be predicted (or compressed) in relation to some or all of (available) reference pictures/images (or decoded pictures/images) using "INTRA" and "INTER_VIEW" prediction methods, but not "INTER" prediction methods.

In cases where "INTER_VIEW" prediction methods are used to predict image data in a dependent view in the second subset of dependent views (3, 2) for the second time instant (2), the dependent view does not refer to another dependent view (e.g., at current, preceding or succeeding time instant 1 or 3, etc.).

At the third time instant (3) (e g, immediately following the first time instant (2), etc.), the viewer's view position and view direction is represented by a third target view (3.2, 3.7) of FIG. 2D. Based on the third target view (3.2, 3.7), a third proper subset of sampled views may be selected from the plurality of sampled views of a third multiview image indexed by the third time instant (3). The third proper subset of sampled views comprises no key view and a third subset of dependent views (3, 3), (3, 4), (4, 3), (4, 4) as indicated in TABLE 1.

Even though the key view (2, 2) is not part of the third proper subset of sampled views for warping/blending image data for the third target view at the third time instant (3), texture and/or depth images (e.g., L1 texture images, L2 texture images, L1 depth images, L2 depth images, unlayered texture images, unlayered depth images) of the key view of the third time instant (3) may nevertheless be predicted (or compressed) in relation to some or all of (available) reference pictures/images (or decoded pictures/images) using some or all of "INTRA", "INTER", and "INTER_VIEW" prediction methods.

The texture and/or depth images of the key view of the third time instant (3) may be decoded before texture and/or depth images of any dependent views (e.g., the third subset of dependent views (3, 3), (3, 4), (4, 3), (4, 4) for the third time instant (3), etc.) of the same third time instant (3).

Texture and/or depth images of any dependent view in the third subset of dependent views (3, 3), (3, 4), (4, 3), (4, 4) of the third time instant (3) may be predicted (or compressed) in relation to some or all of (available) reference pictures/images (or decoded pictures/images) using "INTRA" and "INTER_VIEW" prediction methods, but not "INTER" prediction methods.

In cases where "INTER_VIEW" prediction methods are used to predict image data in a dependent view in the third subset of dependent views (3, 3), (3, 4), (4, 3), (4, 4) for the third time instant (3), the dependent view does not refer to another dependent view (e.g., at current, preceding or succeeding time instant 2 or 4, etc.).

At the fourth time instant (4) (e.g., immediately following the first time instant (3), etc.), the viewer's view position and view direction is represented by a fourth target view (2, 2) of FIG. 2D. Based on the fourth target view (2, 2), a fourth proper subset of sampled views may be selected from the plurality of sampled views of a fourth multiview image indexed by the fourth time instant (4). The fourth proper subset of sampled views comprises the key view (2, 2) and a fourth subset of dependent views. As the target view coincides with the key view (2, 2) at the fourth time instant (4), the fourth subset of dependent views can be selected as a null set as indicated in TABLE 1.

Texture and/or depth images (e.g., L1 texture images, L2 texture images, L1 depth images, L2 depth images, unlayered texture images, unlayered depth images) of the key view of the fourth time instant (3) may be predicted (or compressed) in relation to some or all of (available) reference pictures/images (or decoded pictures/images) using some or all of "INTRA", "INTER", and "INTER_VIEW" prediction methods.

Other illustrated time instants (1-3) involve more than one sampled view and thus involve warping/blending the selected sampled views into the target views of the other illustrated time instants. In contrast, at the fourth time instant (4), only one sampled view—which happens to be the key view (2, 2)—is selected. Accordingly, no warping/blending is needed to generate texture and depth images of the target view at the fourth time instant (4).

7. Applying Decay Factors to Sampled Views

In some embodiments, in the INTER_VIEW prediction mode, a (e.g., multiplicative, exponential, spatial, etc.) decay factor can be assigned to a texture image (or a pair of a texture image and a depth image) of a sampled view in a set of neighboring sampled views of a multiview image and provided/signaled by the upstream device to the downstream device. For example, texture images (or pairs of texture images and depth images) of the neighboring sampled views can be encoded with image metadata indicating their respective decay factors in a multiview video signal or bitstream encoded based at least in part on some or all of the prediction modes as described herein.

A decay factor that is assigned to a texture image or a texture block of a neighboring sampled view can be used to model view dependent effects (e.g., view-position-dependent effects, view-direction-dependent effects, etc.) among texture images—especially L2 texture images—of different views. The downstream device may generate a "modified prediction signal" (e.g., a modified/decayed predicted L1 texture image, a modified/decayed predicted L2 texture image, a modified/decayed predicted L1 texture image block, a modified/decayed predicted L2 texture image block, etc.) by applying an assigned decay factor to a prediction signal (e.g., a predicted L1 texture image, a predicted L2 texture image, a predicted L1 texture image block, a predicted L2 texture image block, etc.) that has been generated based at least in part on disparity compensated prediction in the "INTER_VIEW" prediction mode, as shown in the following expression:

$$\text{modified prediction signal} = \text{disparity compensated prediction signal} * \text{decay factor} \qquad (4)$$

The decay factor can be applied to capture rapidly changing view dependent effects. For instance, when light is reflected by a shiny object or surface, the resultant specular reflection can appear highly view specific (e.g., view-direction specific, view-position specific, etc.), exist only in certain view directions (and/or certain view positions), and fall off quickly in other view directions (and/or other view positions). By way of comparison, when light is reflected by an object or surface that is a less ideal light reflector such as glossy object/surface, the resultant glossy reflection appears less view specific, exists across wider view directions (or wider view positions), and falls off slowly among different view directions (and/or different view positions). When light is reflected by an object or surface that is diffusive, the resultant diffuse reflection appears the least view specific, exists across the widest view directions (or wider view positions), and are relatively less changing if any among different view directions (and/or different view positions).

In some embodiments, in response to determining that a decay factor is to be applied to a decoded texture image of a neighboring sampled view but no explicit value for the decay factor is signaled or transmitted by the upstream device to the downstream device, the downstream device may still set (e.g., compute, assign, infer, etc.) a value for the decay factor by computing/estimating one or more curvatures (e.g., computed/estimated as derivatives of tangents, etc.) of a reflective surface (e.g., in a L2 texture image, etc.) using a decoded depth map of the neighboring sampled view that corresponds to the decoded texture image. A relatively high value can be assigned to the decay factor when the computed/estimated curvatures are relatively high. Conversely, a relatively low value can be assigned to the decay factor when the computed/estimated curvatures are relatively low.

Additionally, optionally or alternatively, a default value can be assigned to the decay factor in response to determining that an explicit value has not been assigned to the decay factor. Default values of decay factors for L1 texture images may be different from default values of decay factors for L2 texture images. For example, the default values for the L1 texture images may be set to one (1), meaning no decay, whereas the default values for the L2 texture images may be set to less than one (1), meaning that there is an assumed decay.

To generate a texture image of the target view "t", the decoded texture images of the neighboring sampled views are warped to the target view "t" using their corresponding decoded depth images (or depth maps); applied (e.g., multiplied, as exponential factors, as logarithmic factors, as functional parameters, etc.) with their respective decay factors (e.g., as illustrated in expression (4), etc.) in response to determining that the decay factors are to be applied during warping; and then blended to generate the texture image of the target view "t".

For the purpose of illustration only, it has been described that various prediction methods and prediction modes can be used for multiview images each comprising multiple image layers with respective image details. It should be noted, however, that in various embodiments, prediction methods and prediction modes as described herein may be used for multiview images each comprising either single image layer or multiple image layers.

8. Example Multiview Image Pipeline

Figure 3A:
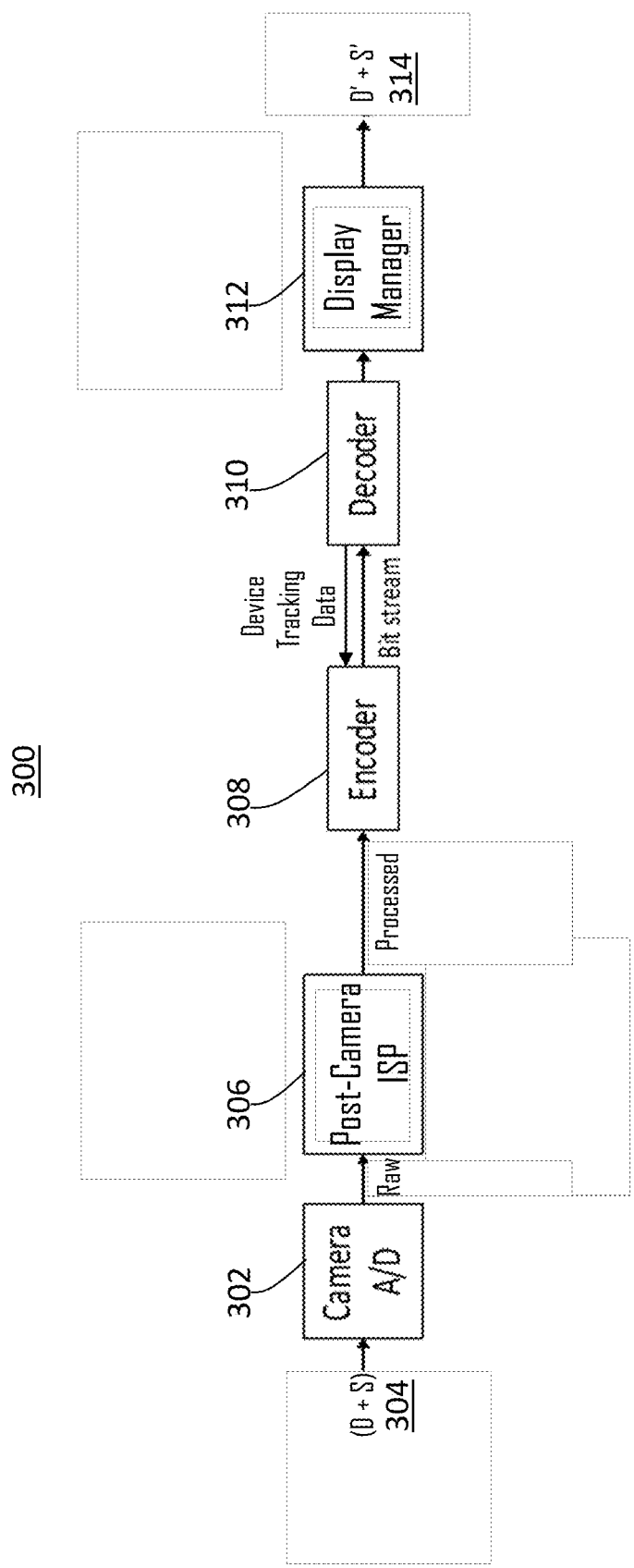
FIG. 3A illustrates an example image processing pipeline for processing images that comprise diffuse and specular components.

FIG. 3A illustrates an example image processing pipeline 300 for processing images with diffuse, specular and other components. In some embodiments, an image capturing device 302 (denoted as "Camera A/D") captures one or more raw multiview images with scene-referred light 304 (e.g., in different color components of a color space, etc.) from a 3D scene. Each of the raw multiview images may comprise a plurality of raw texture images corresponding to a plurality of raw sampled views. The scene-referred light (304) as captured by the image capturing device (302) into the raw multiview images may comprise both diffuse light components (denoted as "D") and specular light components (denoted as "S").

In some embodiments, a post-camera image signal processor (ISP) 306 converts the one or more raw multiview images into one or more processed multiview images (referred to simply as "multiview images"). A processed multiview image (referred to simply as "multiview image") comprises a plurality of processed sampled views (referred to simply as "a plurality of sampled views"). To generate the multiview images for the plurality of sampled views, the post-camera ISP (306) may perform one or more post-processing operations, on the raw multiview images, that may include, but are not necessarily limited to only, any of: auto focus, image sharpening, white balancing, color corrections (e.g., skin tones, etc.), bad pixel corrections, specular and diffuse object segmentation/separation, image layer generation, non-linear pixel value mapping based on optical transfer functions, depth image generation based on disparity information in the raw multiview images and/or camera geometry information, etc.

In some embodiments, each sampled view in a plurality of sampled views of a multiview image as described herein comprises a plurality of single-layer texture images and a plurality of depth images (or depth maps) in a plurality of image layers.

The plurality of image layers may, but is not necessarily limited to only, comprise: a L1 (diffuse) image layer and a L2 (specular) image layer. In some embodiments, each image layer in the plurality of image layers comprises a single-layer texture image (in the plurality of single-layer texture images) and a corresponding depth image (in the plurality of depth images) indicating depth information of visual objects depicted in the single-layer texture image.

A combination of one or more methods in a variety of object segmentation methods may be used to separate specular visual objects (depicted by the specular light components "S") and diffuse visual objects (depicted by the diffuse light components "D") into the L2 (specular) image layer and the L1 (diffuse) image layer in the plurality of image layers. Any of these methods can be based on hardware only, software only, a combination of hardware and software, etc. Example object segmentation methods can be found in Ivo Ihrke et al., "Transparent and Specular Object Reconstruction," COMPUTER GRAPHICS Forum, Volume 29, number 8, pp. 2400-2426 (2010), the entire contents of which are hereby incorporated by reference as if fully set forth herein.

By way of example but not limitation, the separation of the diffuse light components ("D") and the specular light components ("S") in the scene-referred light (304) in the image processing pipeline (300) can be hardware-based.

In some embodiments, an optical beam splitter may be used to create a first optical path of image acquisition and a second optical path of image acquisition concurrently.

The image capturing device (302) can place a light polarizer in the first optical path of image acquisition from a 3D scene (or a 3D image space) to filter out the specular light component "S" (or specular reflections) from the scene-referred light (304). The diffuse light component "D" remaining in the scene-referred light (304) can be used by the image capturing device (302) to generate L1 (diffuse) texture images in the raw multiview images after the specular light component "S" has been removed by the light polarizer from the scene-referred light (304).

The image capturing device (302) can (e.g., concurrently, sequentially, etc.) capture unlayered images in the second optical path of image acquisition from the 3D scene (or the 3D image space) with the light polarizer removed or absent from the second optical path. Each of the unlayered images captured with the second optical path comprises image details depicted by the diffuse light component "D" as well as by the specular light component "S" (or specular reflections) from the scene-referred light (304).

The image processing pipeline (300) (e.g., the image capturing device (302), etc.) can generate L2 texture images (e.g., specular images, etc.) in the raw multiview images based on the differences between the unlayered images captured without the light polarizer and the corresponding L1 texture images captured with the light polarizer in place.

In some embodiments, the separation of respective image details depicted by the diffuse light components ("D") and the specular light components ("S") of the scene-referred light (304) can be software-based. For example, an unlayered image (e.g., an unlayered texture image capturing both specular and diffuse image details, etc.) depicted by the scene-referred light (304) as captured by the image capturing device (102) can be provided to the post-camera ISP (306) for post-camera processing. The post camera ISP (306) can apply one or more object segmentation methods/algorithms (e.g., median cut, detection of bright image portions based on histogram of light levels combined with image morphological operations, image morphological operations, etc.) to the raw pixel values of the unlayered image comprising both diffuse and specular image details, and separate pixels with diffuse image details and pixels with specular image details. The pixels with the diffuse image details in the unlayered image can be segmented into an L1 (diffuse) texture image. The pixels with the specular image details in the unlayered image can be segmented into an L2 (specular) texture image.

In some embodiments, L1 (diffuse) depth images and L2 (specular) depth images can be generated based at least in part on disparity information represented in (diffuse) L1 texture images and L2 (specular) texture images, respectively.

For example, the post-camera ISP (306) and/or the image capturing device (302) can generate the disparity information by analyzing pixel correspondence relationships among the respective texture images based on intensity and/or chromaticity information in the pixels of the respective texture images. In some embodiments, the disparity information may be obtained as a solution in a problem of minimizing a cost function defined based on intensity/chromaticity differences of pixels from different texture images. The depth images (or depth maps) can be obtained from the disparity information using camera geometry information.

The camera geometry information may include, but is not necessarily limited to only, any of: principal points of image planes of image sensors used to acquire raw images, optical centers of the image sensors, focal lengths of the image sensors, depths of image planes of the image sensors, spherical and/or linear skew factors in raw images, angular and positional relationships between the image sensors, etc.

In some embodiments, the camera geometry information can be obtained through calibrating the image acquisition device (302) before (e.g., at factory, in the field by an end user, etc.) the raw multiview images are acquired/captured by the image acquisition device (302).

Due to physical properties of the (noncoherent) scene-referred light (304), light intensities of the diffuse light component ("D") and the specular light component ("S"), which are captured as raw pixel values of the raw multiview images with given exposure settings (or normalization factor(s)), are additive in a linear domain. Further, linear pixel values of subsequent images generated from subsequent linear transformations of the raw pixel values of the raw multiview images are also additive in the linear domain, so long as the subsequent linear transformations use the same scaling factor(s) across pixel values.

For example, linear pixel values in different images (e.g., different texture images, etc.) of different image layers of a sampled view in the (processed) multiview images are additive in the linear domain, provided that the linear pixel values of the different images of the different image layers of the sampled view in the (processed) multiview images are normalized by the same normalization factor (e.g., exposure settings, etc.).

Since the linear pixel values are proportional to the light intensities in the scene-referred light (304), the linear pixel values of the different images of the different image layers of the sampled view of each of the (processed) multiview images can be composited (e.g., as illustrated with expressions (1)-(3) by a downstream device, etc.) additively to reproduce overall light intensities or light levels in the scene-referred light (304) in a reconstructed unlayered image (e.g., an overall texture image, etc.) of the sampled view in each such (processed) multiview image, up to a scaling constant.

Furthermore, so long as warping operations (e.g., by the downstream device in the present example, etc.) do not affect how the light intensities are linearly scaled into linear pixel values of warped images generated from warping images of one or more sampled views, the linear pixel values of the warped images (e.g., warped L1 texture images, warped L2 texture images, etc.) can also be composited (e.g., as illustrated with expressions (1)-(3), etc.) additively to reproduce overall light intensities or light levels in the scene-referred light (304) of an overall warped image (e.g., an overall texture image, etc.) of a target view (e.g., "t", etc.) to which pre-warped images of the one or more sampled views are warped, up to the linear scaling factor.

In other words, linear pixel values of different texture images of different image layers for a view, whether it is a sampled view or a target view, are linear components of the overall light intensities or light levels in the scene-referred light (304) of a reconstructed (e.g., blended, composited, etc.) overall texture image for the same view. Thus, the overall light levels in the scene-referred light (304), as conveyed through the reconstructed overall texture image for the view, can be determined and rendered by the downstream device through adding up all the light levels of the different texture images of the different image layers for the same view as represented by the linear pixel values in the linear domain.

In some embodiments, an upstream device such as a video encoder 308 in the image processing pipeline (300) receives real-time device tracking data of a wearable device from a downstream device such as a video decoder 310 in the image processing pipeline (300). The device tracking data enables the video encoder (308) to determine view positions (e.g., spatial positions, etc.) and/or view directions (e.g., spatial directions, etc.) of the wearable device at a plurality of time instants (or time points).

A target view (e.g., "t", etc.) at the given time instant, as indicated by a view position and a view direction of the wearable device at a given time instant in the plurality of time instants, may be determined by the video encoder (308) with minimal delay (e.g., 1 millisecond, 3 milliseconds, 5 milliseconds, etc.), within a strict real time budget, etc., as measured from the given time instant.

Based on the target view, the video encoder (308) identifies a set of neighboring sampled views (e.g., a proper subset, etc.) in the plurality of sampled views. The video encoder (308) accesses single-layer texture image data and corresponding depth images (e.g., L1 depth images, L2 depth images, etc.) of each sampled view in the set of neighboring sampled views.

In some embodiments, L1 texture images, L2 texture images, etc., of each sampled view in the set of neighboring sampled views that comprise linear pixel values are provided as the single-layer texture image data by the post-camera ISP (306) to the video encoder (308).

In some other embodiments, mapped L1 texture images, mapped L2 texture images, etc., of each sampled view in the set of neighboring sampled views that comprise non-linear pixel values are provided as the single-layer texture image data by the post-camera ISP (306) to the video encoder (308).

For example, the L1 texture images, the L2 texture images, etc., of each sampled view in the set of neighboring sampled views that comprise linear pixel values are first mapped by the post-camera ISP (306) into the mapped L1 texture images, the mapped L2 texture images, etc., that comprise the non-linear pixel values, based on a non-linear mapping function, such as an optical transfer function, an OETF, an OOTF, a perceptual quantization function, an HLG functions, a gamma-based compression function, etc., to map linear pixel values in the linear domain to mapped pixel values in a non-linear domain.

The non-linear mapping function may or may not be based on perceptual quantization. In some embodiments, the non-linear mapping function is a gamma curve (e.g., a gamma compression function, an HLG function, etc.), which may be applied as an OETF. In some embodiments, the non-linear mapping function is a PQ-based curve, which may be applied as the OETF. In some embodiments, the non-linear mapping function may comprise a number of anchor points (e.g., max value, min value, mid-tone value, etc.) adjustable based on image content and may be used to emphasize or preserve better the perceptually relevant/important parts of the texture images of the different image layers.

In some embodiments, the video encoder (308) encodes the L1 texture images, the L2 texture images, the L1 depth images, the L2 depth images, etc., of each sampled view in the set of neighboring sampled views into a multiview video signal or bitstream; transmits/provides the multiview video signal or bitstream directly or through intermediate devices to the video decoder (310) in the downstream device; etc.

Additionally, optionally or alternatively, the video encoder (308) encodes the mapped L1 texture images, the mapped L2 texture images, etc.,—instead of or in addition to the L1 texture images, the L2 texture images, etc.—of each sampled view in the set of neighboring sampled views into the multiview video signal or bitstream. Any combination of one or more video signal encoding methods in a variety of video signal encoding methods can be used.

In cases where one or more "INTER_VIEW" prediction methods are used for prediction (or compression), key view images that are of sampled views not included in the set of neighboring sampled views, may also be encoded along with any dependent view images that are of sampled views included in the set of neighboring sampled views into the multiview video signal or bitstream. Additionally, optionally or alternatively, zero, one or more other prediction methods (e.g., "INTER" prediction methods, "INTRA" prediction methods, etc.) other than the "INTER_VIEW" prediction methods can be used for prediction (or compression) in encoding some or all of the key view images and the dependent view images that are to be sent to the downstream device.

In some embodiments, the video encoder (308) signals prediction methods used in encoding, operational parameters used in the prediction methods, (e.g., non-linear, etc.) mapping functions (e.g., optical transfer functions, electric transfer functions, perceptual quantization functions, HLG functions, gamma-based functions, tone mapping functions, inverse tone mapping functions, etc.) used in encoding, operational parameters (e.g., gamma value, min luminance, max luminance, mid-tone luminance, pivots, offsets, slopes, etc.) used in the mapping functions, etc., to the downstream device. For example, some or all of indexes or IDs identifying the prediction methods, indexes or IDs identifying the mapping functions, the operational parameters for these methods and/or functions, etc., may be encoded in-band (e.g., fill elements, header fields, etc., in image data payloads, etc.) or separately (e.g., as metadata fields, in a separate metadata sub-stream, etc.) from image data.

Figure 3B:
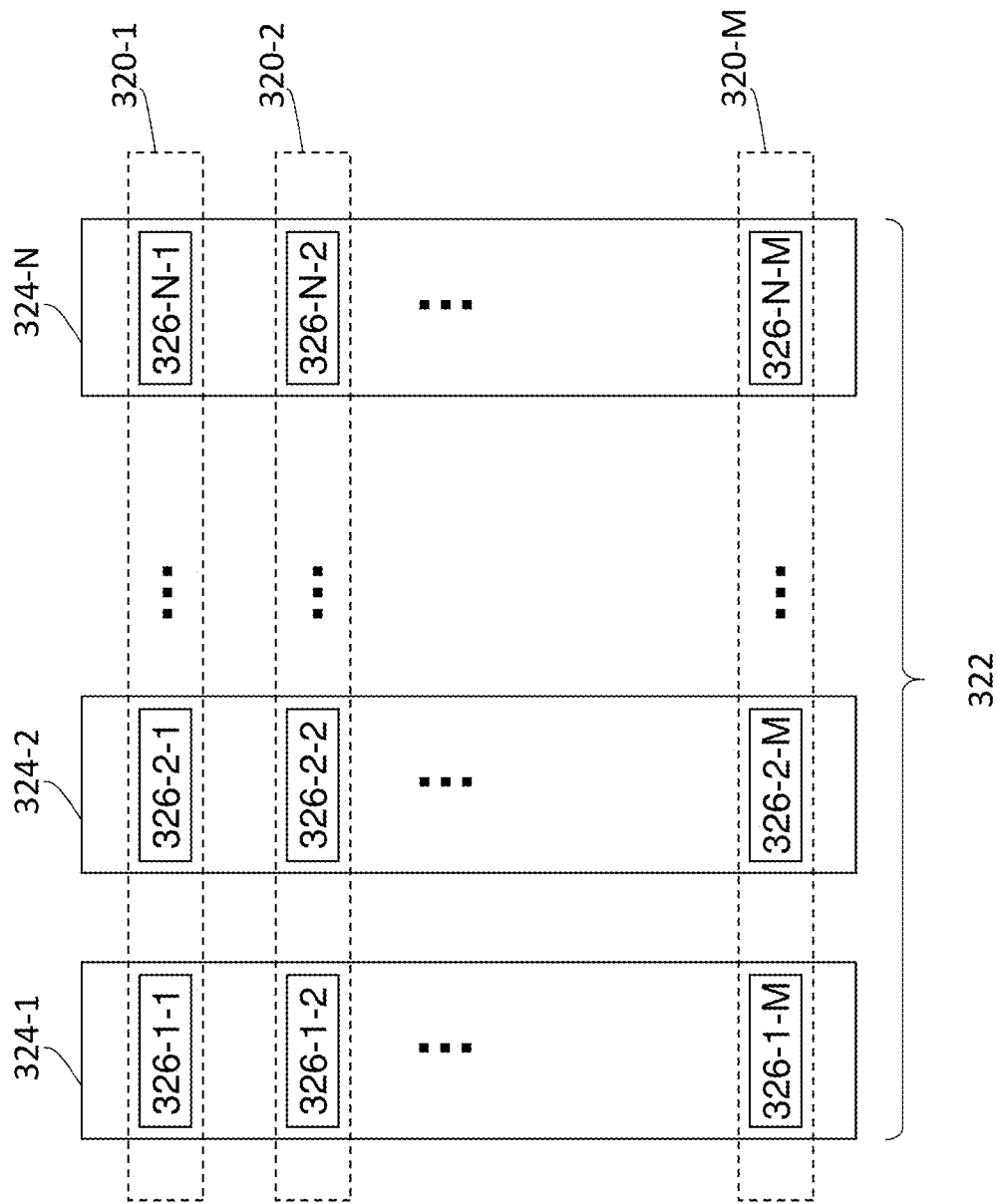
FIG. 3B illustrates an example multiview image that comprise a plurality sampled views.

FIG. 3B illustrates an example multiview image 322 that comprise a plurality of sampled views 324-1, 324-2 through 324-N with image data (e.g., texture images and depth images, etc.) segmented into a plurality of image layers 320-1, 320-2 through 320-M. The image layer (320-1) may be a L1 (diffuse) image layer into which L1 texture images and L1 depth images of the plurality of sampled views (324-1, 324-2 through 324-N) are segmented. The image layer (320-2) may be a L2 (specular) image layer into which L2 texture images and L2 depth images of the plurality of sampled views (324-1, 324-2 through 324-N) are segmented.

Each sampled view (e.g., one of 324-1, 324-2 through 324-N, etc.) may comprise single-layer image data such as a texture image and a corresponding depth image in each image layer (e.g., one of 320-1, 320-2 through 320-M, etc.). As illustrated in FIG. 3B, the sampled view (324-1) may comprise single-layer image data (326-1-1) in the image layer (320-1), single-layer image data (326-1-2) in the image layer (320-2), . . . , single-layer image data (326-1-M) in the image layer (320-M). The sampled view (324-2) may comprise single-layer image data (326-2-1) in the image layer (320-1), single-layer image data (326-2-2) in the image layer (320-2), . . . , single-layer image data (326-2-M) in the image layer (320-M). The sampled view (324-N) may comprise single-layer image data (326-N–1) in the image layer (320-1), single-layer image data (326-N–2) in the image layer (320-2), . . . , single-layer image data (326-N–M) in the image layer (320-M).

In some embodiments, the multiview video signal or bitstream can represent a multiview multi-layer video signal or bitstream that comprises two or more video signal layers each of which is used to carry a respective image layer in the plurality of image layers of a sequence of multiview images that include the multiview image in the present example.

Figure 3C:
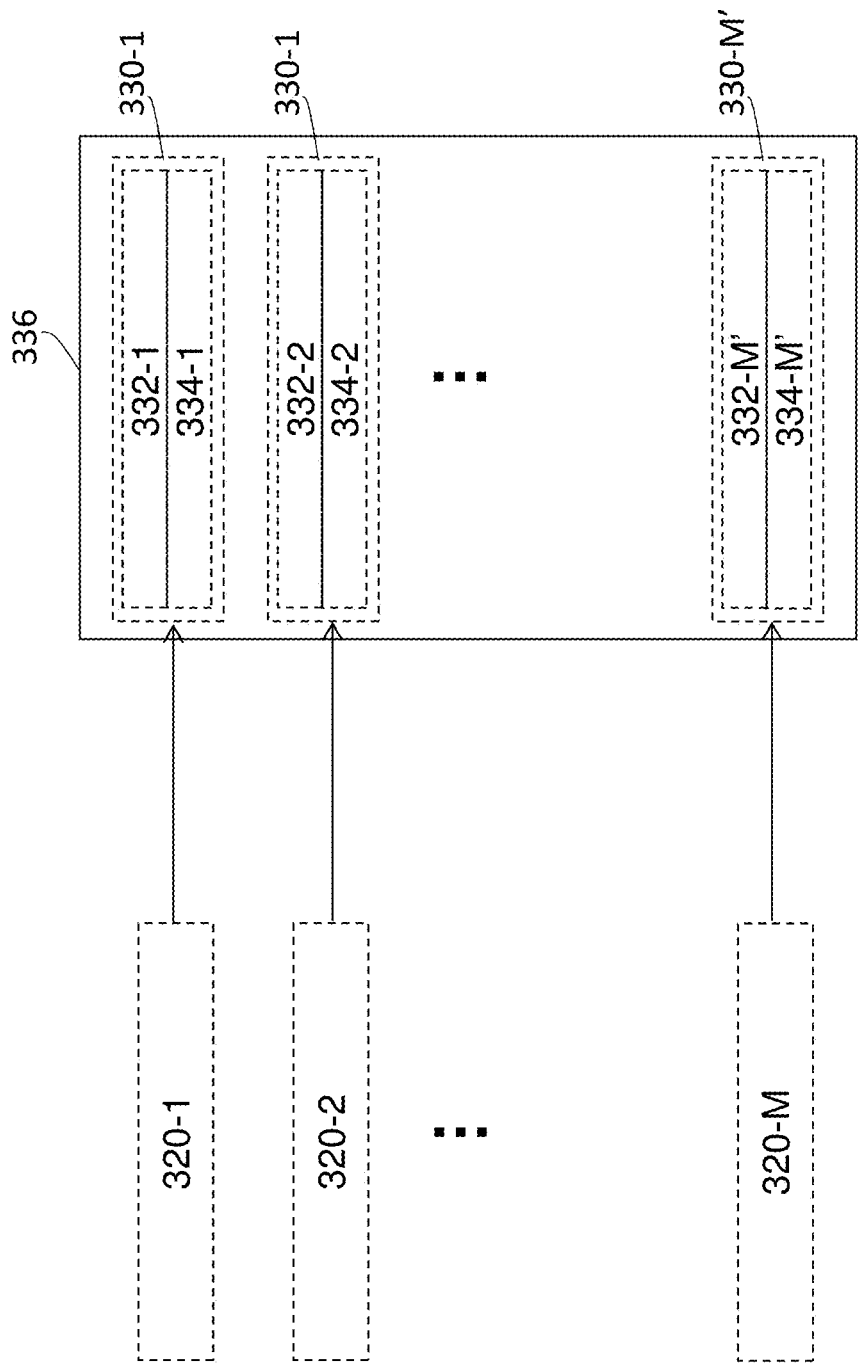

FIG. 3C illustrates an example signal structure of a multiview (multi-layer) video signal (or bitstream) 336. The multiview video signal (336) comprises a plurality of signal layers 330-1, 330-2, through 330-M'. Each signal layer (e.g., one of 330-1, 330-2, through 330-M', etc.) may comprise media data fields/containers (e.g., one of 332-1, 332-2, through 332-M', etc.) for carrying media data. Each such signal layer may comprise media related metadata fields/containers (e.g., one of 334-1, 334-2, through 334-M', etc.) for carrying media related metadata. The number of signal layers in the multiview video signal (336) may or may not be the same as the number of image layers used to segment a sampled view in a multiview image (e.g., 322, etc.). In some embodiments, image data in each image layer may be carried in a corresponding single signal layer in the multiview video signal (336).

Additionally, optionally or alternatively, the multiview video signal or bitstream can represent a multiview single-layer video signal or bitstream that comprises a single video signal layer that can be used to carry a selected image layer (e.g., the L1 (diffuse) image layer, etc.) in the plurality of image layers of a sequence of multiview images that include the multiview image in the present example. Other (e.g., non-selected, remaining, etc.) image layers (e.g., the L2 (specular) image layer, etc.) in the plurality of image layers of the sequence of multiview images can be coded into data constructs in the multiview single-layer video signal or bitstream that are designated for carrying image metadata.

FIG. 3D illustrates an example signal structure of a multiview (single-layer) video signal (or bitstream) 338. The multiview video signal (338) comprises only a single signal layer and may use a backward compatible video signal format supported by legacy video decoders. The single signal layer may comprise media data fields/containers 332 for carrying media data. Each such signal layer may comprise media related metadata fields/containers 334 for carrying media related metadata. In some embodiments, image data in one image layer (e.g., with the largest amount of texture and depth image data, the L1 image layer, etc.) may be carried in the media data fields/containers (332) in the multiview video signal (338). Image data in the other image layer(s) (e.g., the L2 image layer, etc.) may be carried in the media related metadata fields/containers (334) in the multiview video signal (338).

In some embodiments, the video decoder (310) operates with a device tracker (not shown) to collect the real-time device tracking data of the wearable device from the device tracker. The device tracking data of the wearable device may be transmitted by the video decoder (310) directly or through intermediate devices to the video encoder (308). Example device tracking and device trackers can be found in U.S. patent application Ser. No. 15/949,536, with an application title of "PASSIVE MULTI-WEARABLE-DEVICES TRACKING" by Ajit Ninan and Neil Mammen, filed on Apr. 10, 2018, the entire contents of which are hereby incorporated by reference as if fully set forth herein.

In some embodiments, the video decoder (310) receives the multiview video signal or bitstream; decodes the multiview video signal or bitstream into the L1 texture images, the L2 texture images, the L1 depth images, the L2 depth images, etc., of each sampled view in the set of neighboring sampled views into a multiview video signal or bitstream; etc. Additionally, optionally or alternatively, the video decoder (310) decodes the multiview video signal or bitstream into the mapped L1 texture images, the mapped L2 texture images, etc.,—instead of or in addition to the L1 texture images, the L2 texture images, etc.—of each sampled view in the set of neighboring sampled views.

In cases where one or more "INTER_VIEW" prediction methods are used for prediction (or compression), key view images that are of sampled views not included in the set of neighboring sampled views, may also be decoded along with (e.g., before, etc.) any dependent view images that are of sampled views included in the set of neighboring sampled views into the multiview video signal or bitstream. Additionally, optionally or alternatively, zero, one or more other prediction methods other than the "INTER_VIEW" prediction methods can be used for prediction (or compression) in decoding some or all of the key view images and the dependent view images that are received from the upstream device (e.g., the video encoder (308), etc.).

In some embodiments, the video decoder (310) extracts/retrieves some or all of the indexes or IDs identifying the prediction methods, the indexes or IDs identifying mapping functions, the operational parameters for these methods and/or functions, etc., from the multiview video signal or bitstream.

In some embodiments, the device tracking data as collected by the video decoder (310) operating in conjunction with the device tracker enables one or both of the video encoder (308) and the video decoder (310) to determine or share view positions (e.g., spatial positions, etc.) and/or view directions (e.g., spatial directions, etc.) of the wearable device at a plurality of time instants (or time points). A target view (e.g., "t", etc.) at the given time instant, as indicated by a view position and a view direction of the wearable device at a given time instant in the plurality of time instants, may be determined or shared by one or both of the video encoder (308) and the video decoder (310) with minimal delay (e.g., 1 millisecond, 3 milliseconds, 5 milliseconds, etc.), within a strict real time budget, etc., as measured from the given time instant.

Based on the target view "t", the video decoder (310) warps the decoded L1 texture images (or the decoded mapped L1 texture images) in the set of the neighboring sampled views to warped L1 texture images (or warped mapped L1 texture images) of the target view "t" using the corresponding decoded L1 depth maps. The warped L1 texture images (or the warped mapped L1 texture images) of the target view "t" may be blended into an overall warped L1 texture image (or an overall warped mapped L1 texture image) of the target view "t".

Similarly, based on the target view "t", the video decoder (310) warps the decoded L2 texture images (or the decoded mapped L2 texture images) in the set of the neighboring sampled views to warped L2 texture images (or warped mapped L2 texture images) of the target view "t" using the corresponding decoded L2 depth maps. The warped L2 texture images (or the warped mapped L2 texture images) of the target view "t" may be blended into an overall warped L2 texture image (or an overall warped mapped L2 texture image) of the target view "t".

In some embodiments, the video decoder (310) composites the overall warped L1 texture image (or the overall warped mapped L1 texture image) of the target view "t" and the overall warped L2 texture image (or the overall warped mapped L2 texture image) of the target view "t" into an overall unlayered texture image of the target view "t" that comprises both specular and diffuse image details, for example as illustrated in expressions (1) through (3).

In some embodiments, the composition of the overall warped L1 texture image (or the overall warped mapped L1 texture image) of the target view "t" and the overall warped L2 texture image (or the overall warped mapped L2 texture image) of the target view "t" into the overall unlayered texture image of the target view "t" may be performed by an addition operation in a linear domain, with or without weight factors.

In cases where non-linear pixel values in texture images in the neighboring sampled views are decoded/received by the video decoder (310) from the video encoder (308), the overall warped mapped L1 texture image, the overall warped mapped L2 texture image, etc., comprise non-linear pixel values in a non-linear domain. These non-linear pixel values in the overall warped mapped L1 texture image, the overall warped mapped L2 texture image, etc., can be mapped by the video decoder (310) into linear pixel values in a linear domain, based on a non-linear mapping function, such as an electric transfer function, an EOTF, an inverse OETF, a perceptual quantization function, an HLG function, a gamma-based expansion function, etc. These linear pixel values constitute an overall warped L1 texture image, an overall warped L2 texture image, etc., in the linear domain.

The non-linear mapping function from the non-linear domain to the linear domain conceptually is an inverse mapping to the non-linear mapping function from the linear domain to the non-linear domain used by the upstream device. The non-linear mapping function may or may not be based on perceptual quantization. In some embodiments, the non-linear mapping function is a gamma curve (e.g., a gamma expansion function, an HLG function, etc.), which may be applied as an EOTF. In some embodiments, the non-linear mapping function is a PQ-based curve, which may be applied as the EOTF. In some embodiments, the non-linear mapping function may comprise a number of anchor points (e.g., max value, min value, mid-tone value, etc.) adjustable based on image content and may be used to emphasize or preserve better the perceptually relevant or important parts of the texture images of the different image layers. Information specifying these anchor points may be embedded by the video encoder (308) into, and extracted/retrieved by the video decoder (310) from the multiview video signal or bitstream.

In some embodiments, the video decoder (310) sends/provides the overall unlayered texture image of the target view "t" that comprises both specular and diffuse image details to a display manager 312.

In cases where the display manager (312) may support an input signal format with non-linear pixel values quantized with a specific optical transfer function, the video decoder (310) may format or reformat the overall unlayered texture image of the target view "t" into the supported input signal format. In some embodiments, in response to determining that the overall unlayered texture image of the target view "t" generated by compositing the warped texture images is not in the supported input signal format, the video decoder (310) can first convert (e.g., linear, non-linear, etc.) pixel values in the overall unlayered texture image of the target view "t" in a signal format that is not supported by the display manager (312) to (e.g., linear, non-linear, etc.) pixel values in the supported input signal format, for example based on a non-linear mapping function such as an OETF, a perceptual quantization function, a HLG function, a gamma-based function, etc. Thus, in some embodiments, a (e.g., legacy, etc.) display device is not required to adapt or alter its software and/or hardware implementation, in order to render the overall unlayered texture image generated by techniques as described herein.

In some embodiments, the display manager (312) operates with a display driver to generate a display image from the overall unlayered texture image of the target view "t", and renders the display image with a display of the wearable device. The display image reproduces the specular and diffuse image details 314 (denoted as "(D'+S')") as originally captured by the image capturing device (302) from the 3D scene (or the 3D image space).

In some embodiments, dynamically adaptive streaming may be used to deliver texture images and depth images in different image layers as described herein from a media streaming server (e.g., the upstream device, the video encoder (308), etc.) to a media streaming client (e.g., the downstream device, the video decoder (310), etc.).

The media streaming client may request the media streaming server to provide a bitstream comprising only the L1 (diffuse) images in the L1 (diffuse) image layer, for example, in scenarios in which network bandwidths are limited, transmission and processing delays are significant, display capabilities for rendering high brightness are limited, etc.

In cases where a display device supports a relatively limited dynamic range and/or a relatively small color gamut, a media streaming client operating with the display device may request only L1 (diffuse) images from a media streaming server, as the display device may not be able to render specular image details depicted in L2 (specular) images. If the multiview video signal or bitstream represents a multiview multi-layer video signal or bitstream, only a single video signal layer among the multiple video signal layers, which comprises the requested the L1 (diffuse) images, may be transmitted to the media streaming client. If the multiview video signal or bitstream represents a multiview single-layer video signal or bitstream, the L1 (diffuse) images in the video signal layer may be transmitted to the media streaming client; some or all of the image data carried in the image metadata containers/constructs of the multiview single-layer video signal or bitstream may be omitted from being transmitted to the media streaming client.

The media streaming client may request the media streaming server to provide a bitstream comprising the L1 (diffuse) images in the L1 (diffuse) image layer as well as the L2 (specular) images in the L2 (specular) image layer, for example, in scenarios in which network bandwidths are relatively large, transmission and processing delays are relatively small, display capabilities for rendering high brightness are available, etc. If the multiview video signal or bitstream represents a multiview multi-layer video signal or bitstream, two or more video signal layers, which comprise the requested the L1 (diffuse) images and the L2 (specular) images, may be transmitted to the media streaming client. If the multiview video signal or bitstream represents a multiview single-layer video signal or bitstream, the L1 (diffuse) images in the video signal layer, along with the L2 (specular) images in the image metadata containers/constructs, may be transmitted to the media streaming client.

Techniques as described herein can operate with the downstream device that may or may not support multiple image layers. Even when the downstream device only supports the multiview single-layer video signal, the downstream device still can be provided with the diffuse texture images for rendering/displaying. Image hole filling algorithms may be used by the upstream device and/or by the downstream device to handle (or generate appropriate pixel values in) any image holes left in pixel positions represented by the specular texture images. Thus, the diffuse texture images generated by the techniques as described herein can appear with correct light intensities (or light levels) even in legacy single-layer decoders and/or renderers.

In some embodiments, numbers of L1 (diffuse) texture images and L2 (specular) texture images used to construct the same overall unlayered image (of a target view) that contains both specular and diffuse image details may be different. For example, as L1 (diffuse) texture images may be less varying, a relatively small number of L1 (diffuse) texture images for a relatively small set of neighboring sampled views (or relatively sparse views) may be sent/transmitted from the media streaming server to the media streaming client and used to construct the overall unlayered image of the target view (e.g., "t", etc.). In contrast, as L2 (specular) texture images may be more varying, a relatively large number of L2 (specular) texture images for a relatively large set of neighboring sampled views (or relatively dense views) may be sent and used to construct the overall unlayered image of the target view (e.g., "t", etc.). The relatively dense views of the L2 (specular) texture images may be used by the media streaming client to capture view-dependent effects of specular reflections and thus to provide a relatively immersive user experience.

9. Example Process Flows

FIG. 4A illustrates an example process flow according to an example embodiment of the present invention. In some example embodiments, one or more computing devices or components may perform this process flow. In block 402, an image processing device determines a target view to a 3D scene depicted by a multiview image. The image processing device may be an upstream device comprising one or more of: an image capturing device (e.g., 302 of FIG. 3A, etc.), a post-camera ISP (e.g., 306 of FIG. 3A, etc.), a video encoder (e.g., 308 of FIG. 3A, etc.), etc. The multiview image comprises a plurality of sampled views. Each sampled view of the multiview image comprises a plurality of texture images and a plurality of depth images in a plurality of image layers. Each sampled view of the multiview image comprises a texture image in the plurality of texture images and a depth image in the plurality of depth images for each image layer in the plurality of image layers.

In block 404, the image processing device uses the target view to select, from the plurality of sampled views of the multiview image, a set of sampled views. Each sampled view in the plurality of sampled views corresponds to a respective viewpoint to the 3D scene.

In block 406, the image processing device encodes a texture image and a depth image for each sampled view in the set of sampled views into a multiview video signal to be transmitted to a downstream device. Alternatively, all the sampled views can be pre-encoded into a set of key view bitstreams and dependent view bitstreams, and, for a given target view, only the required set of dependent view bitstreams and all key view bitstreams are transmitted to a downstream device.

In an embodiment, the set of sampled views is for a first image layer in the plurality of image layers; the image processing device is further configured to perform: using the target view to select, from the plurality of sampled views of the multiview image, a second set of sampled views for a second different image layer in the plurality of image layers; encoding a second texture image and a second depth image for each sampled view in the second set of sampled views into the multiview video signal; etc. In an embodiment, the set of sampled views for the first image layer is same as or different from the second set of sampled views for the second image layer. In an embodiment, the texture image depicts diffusive image details in the first image layer in the plurality of image layers, whereas the second different texture image depicts specular image details in the second image layer in the plurality of image layers.

In an embodiment, the multiview image is a part of a sequence of multiview images indexed by a sequence of time instants.

In an embodiment, the target view is determined based on a spatial position and a spatial direction of a wearable device operating in conjunction with the downstream device.

In an embodiment, the target view coincides with a sampled view in the plurality of sampled views.

In an embodiment, the target view does not coincide with any sampled view in the plurality of sampled views.

In an embodiment, the set of sampled views represents a proper subset of the plurality of sampled views of the multiview image.

In an embodiment, the set of sampled views comprises neighboring sampled views, relative to the target view, that are selected from the plurality of sampled views based on one or more of: linear distances of view positions of the neighboring sampled views to a view position of the target view, angular distances of view directions of the neighboring sampled views to a view direction of the target view, etc. In an embodiment, downstream device uses prediction algorithms to estimate a target view position and direction (e.g. based on previous target view parameters) and pre-fetch appropriate sampled views. This may be used to avoid delay in first measuring the viewer position and then requesting the necessary sampled views.

In an embodiment, the multiview view signal comprises a multi-layer signal structure in which texture images and depth images in two or more image layers in the plurality of image layers are encoded into two or more signal layers, respectively, in a plurality of signal layers of the multiview view signal.

In an embodiment, at least one of the texture image and the depth image is encoded based at least in part on one or more of: one or more INTRA prediction methods, one or more INTER prediction methods, one or more INTER_VIEW prediction methods, etc.

In an embodiment, the set of sampled views are neighboring sampled views, among the plurality of sampled views of the multiview image, closest to the target view.

In an embodiment, the multiview video signal comprises a single-layer signal structure.

FIG. 4B illustrates an example process flow according to an example embodiment of the present invention. In some example embodiments, one or more computing devices or components may perform this process flow. In block 422, an image processing device decodes a multiview video signal into a set of texture images and a set of depth images for a set of sampled views of a multiview image. The image processing device may be a downstream device comprising one or more of: a video decoder (e.g., 310 of FIG. 3A, etc.), a display manager (e.g., 312 of FIG. 3A, etc.), etc. Each sampled view in the set of sampled views corresponds to a respective viewpoint in a set of viewpoints to a 3D scene.

In block 424, the image processing device warps the set of texture images to a set of warped texture images of a target view based on the set of depth images.

In block 426, the image processing device blends the set of warped texture images of the target view into a blended warped texture image of the target view.

In block 428, the image processing device causes a display image derived at least in part from the blended warped texture image of the target view to be rendered on a display of a wearable device.

In an embodiment, the set of sampled views is for a first image layer in a plurality of image layers; the image processing device is further configured to perform: decoding the multiview video signal into a second set of texture images and a second set of depth images for a second set of sampled views of the multiview image, each sampled view in the set second of sampled views corresponding to a respective second viewpoint in a second set of viewpoints to the 3D scene; warping the second set of texture images to a second set of warped texture images of the target view based on the second set of depth images; blending the second set of warped texture images of the target view into a second blended warped texture image of the target view; etc.

In an embodiment, the image processing device is further configured to perform: compositing a plurality of blended warped texture images of the target view including the blended warped texture image and the second blended warped texture image into a synthesized texture image of the target view. The display image is derived from the synthesized texture image of the target view.

In an embodiment, compositing the plurality of blended warped texture images of the target view includes performing one of: an unweighted composition operation, a differentially weighted composition operation, an equally weighted composition operation, etc.

In an embodiment, compositing the plurality of blended warped texture images of the target view includes performing an addition operation on linear pixel values derived from the plurality of blended warped texture images of the target view.

In an embodiment, the image processing device is further configured to apply a non-linear mapping as a part of compositing the synthesized texture image of the target view.

In an embodiment, the foregoing is performed by a downstream device that receives the multiview video signal from an upstream device; the target view is determined based on device tracking information indicating a spatial position and a spatial direction of the wearable device operating in conjunction with the downstream device.

In an embodiment, the set of sampled views is selected based on the target view from a plurality of sampled views of the multiview image.

In an embodiment, the image processing device is further configured to apply a respective decay factor to each warped texture image in the set of warped texture images of the target view as a part of blending the set of warped texture images of the target view to the blended warped texture image of the target view.

In an embodiment, the respective decay factor to each such warped texture image is determined based on one of: a linear distance between a sampled view associated with each such warped texture image and the target view, an angular distance between the sampled and the target view, a combination of the linear distance and the angular distance, etc.

In an embodiment, at least one of the texture image and the depth image is decoded based at least in part on one or more of: one or more INTRA prediction methods, one or more INTER prediction methods, one or more INTER_VIEW prediction methods, etc.

FIG. 4C illustrates an example process flow according to an example embodiment of the present invention. In some example embodiments, one or more computing devices or components such as an image processing device may perform this process flow. The image processing device may be an upstream device comprising one or more of: an image capturing device (e.g., 302 of FIG. 3A, etc.), a post-camera ISP (e.g., 306 of FIG. 3A, etc.), a video encoder (e.g., 308 of FIG. 3A, etc.), etc. In block 442, the image processing device creates a prediction structure for one or more multiview images each of which comprises a plurality of single-view images for a plurality of sampled views, the prediction structure designating one or more sampled views in the plurality of sampled views as one or more key views, the predicting structure designating all remaining sampled views in the plurality of sampled views as dependent views.

In block 444, the image processing device generates one or more predicted multiview image data portions for the one or more key views in the prediction structure based at least in part on one or more already reconstructed multiview image data portions for the one or more key views.

In block 446, the image processing device generates a predicted multiview image data portion for a current dependent view in the prediction structure based at least in part on one or more of: the one or more predicted multiview image data portions for the one or more key views, or one or more already reconstructed multiview image data portions of the current dependent view.

In block 448, the image processing device encodes one or more residual multiview image data portions for the one or more key views and a residual multiview image data portion for the current dependent view into a multiview video signal to be transmitted to a downstream device, the one or more residual multiview image data portions for the one or more key views being generated based on the one or more predicted multiview image data portions for the one or more key views and one or more single-view images for the one or more key views, the residual multiview image data portion for the current dependent view being generated based on the predicted multiview image data portion for the current dependent view and a single-view image for the current dependent view.

Figure 4D:
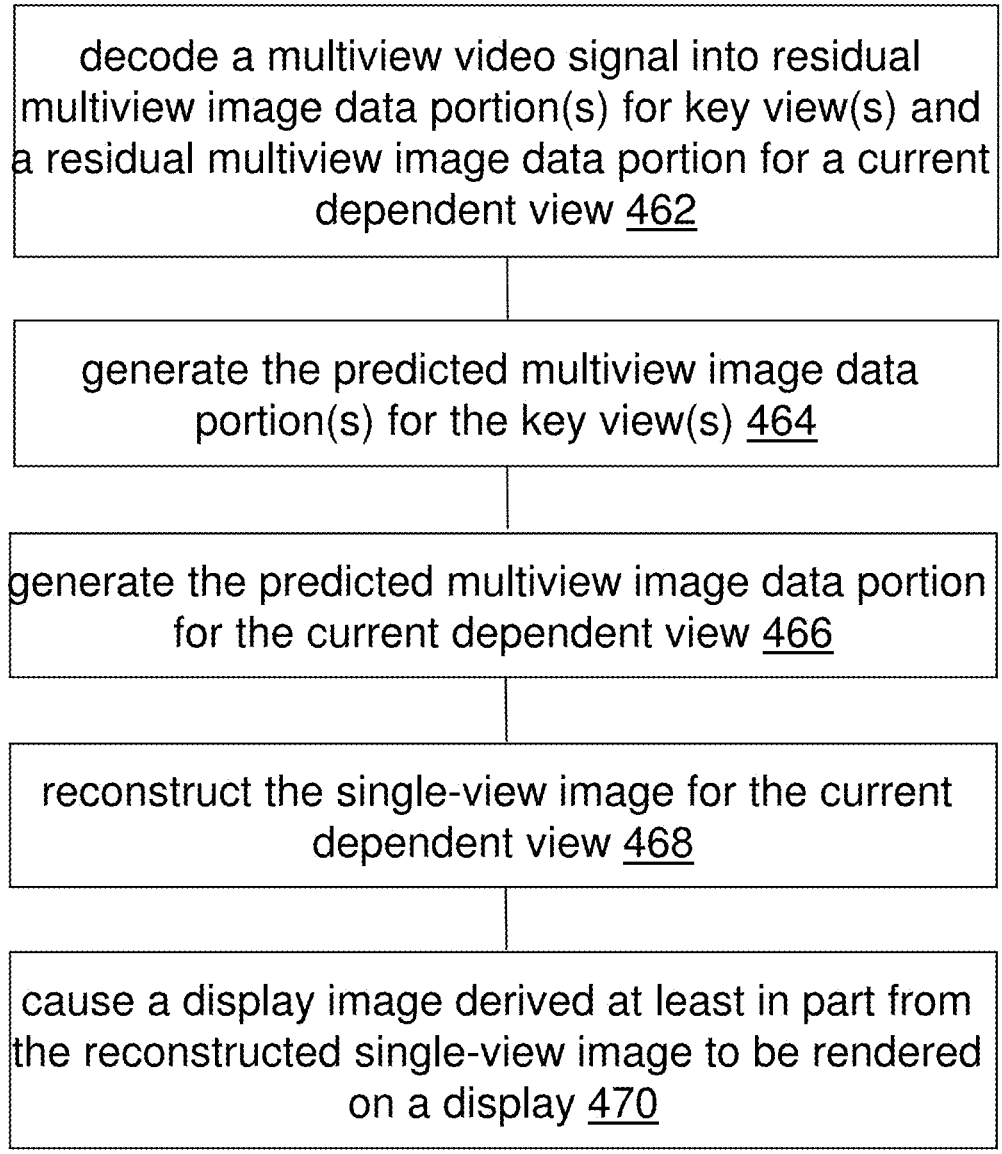

FIG. 4D illustrates an example process flow according to an example embodiment of the present invention. In some example embodiments, one or more computing devices or components such as an image processing device may perform this process flow. The image processing device may be a downstream device comprising one or more of: a video decoder (e.g., 310 of FIG. 3A, etc.), a display manager (e.g., 312 of FIG. 3A, etc.), etc. In block 462, the image processing device decodes a multiview video signal into one or more residual multiview image data portions for one or more key views in a prediction structure and a residual multiview image data portion for a current dependent view in the prediction structure, the one or more residual multiview image data portions for the one or more key views having been generated based on one or more predicted multiview image data portions for the one or more key views and one or more single-view images for the one or more key views, the residual multiview image data portion for the current dependent view having been generated based on a predicted multiview image data portion for the current dependent view and a single-view image for the current dependent view, the one or more key views and the current dependent view belonging to a plurality of sampled views of one or more multiview images.

In block 464, the image processing device generates the one or more predicted multiview image data portions for the one or more key views based at least in part on one or more of: the one or more residual multiview image data portions for the one or more key views and one or more already reconstructed multiview image data portions for the one or more key views.

In block 466, the image processing device generates the predicted multiview image data portion for the current dependent view based at least in part on one or more of: the one or more predicted multiview image data portions for the one or more key views, the one or more already reconstructed multiview image data portions for the one or more key views, or one or more already reconstructed portions of the current dependent view.

In block 468, the image processing device reconstructs the single-view image for the current dependent view based on the predicted multiview image data portion for the current dependent view and the residual multiview image data portion for the current dependent view.

In block 470, the image processing device causes a display image derived at least in part from the reconstructed single-view image for the current dependent view to be rendered on a display.

In various example embodiments, an apparatus, a system, an apparatus, or one or more other computing devices performs any or a part of the foregoing methods as described. In an embodiment, a non-transitory computer readable storage medium stores software instructions, which when executed by one or more processors causes performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   determining a target view to a 3D scene depicted by a multiview image, the multiview image comprising a plurality of sampled views, each sampled view of the multiview image comprising a plurality of texture images and a plurality of depth images in a plurality of image layers, each sampled view of the multiview image comprising a texture image in the plurality of texture images and a depth image in the plurality of depth images for each image layer in the plurality of image layers;
   using the target view to select, from the plurality of sampled views of the multiview image, a set of one or more sampled views, each sampled view in the plurality of sampled views corresponding to a respective viewpoint to the 3D scene, wherein each sampled view in the set of one or more sampled views is selected based on the target view and is different from the target view;
   encoding a texture image and a depth image for each sampled view in the set of one or more sampled views into a multiview video signal to be transmitted to a downstream device.

2. The method of claim 1, wherein the set of one or more sampled views is for a first image layer in the plurality of image layers; further comprising:
   using the target view to select, from the plurality of sampled views of the multiview image, a second set of one or more sampled views for a second different image layer in the plurality of image layers;
   encoding a second texture image and a second depth image for each sampled view in the second set of one or more sampled views into the multiview video signal.

3. The method of claim 2, wherein the set of one or more sampled views for the first image layer is same as or different from the second set of one or more sampled views for the second image layer.

4. The method of claim 2, wherein the texture image depicts diffusive image details in the first image layer in the plurality of image layers, and wherein the second different texture image depicts specular image details in the second image layer in the plurality of image layers.

5. The method of claim 1, wherein the multiview image is a part of a sequence of multiview images indexed by a sequence of time instants.

6. The method of claim 1, wherein the target view is determined based on a spatial position and a spatial direction of a wearable device operating in conjunction with the downstream device.

7. The method of claim 1, wherein the target view coincides with a sampled view in the plurality of sampled views.

8. The method of claim 1, wherein the target view does not coincide with any sampled view in the plurality of sampled views.

9. The method of claim 1, wherein the set of one or more sampled views represents a proper subset of the plurality of sampled views of the multiview image.

10. The method of claim 1, wherein the set of one or more sampled views comprises neighboring sampled views, relative to the target view, that are selected from the plurality of sampled views based on one or more of: linear distances of view positions of the neighboring sampled views to a view position of the target view, or angular distances of view directions of the neighboring sampled views to a view direction of the target view.

11. The method of claim 1, wherein the multiview signal comprises a multi-layer signal structure in which texture images and depth images in two or more image layers in the plurality of image layers are encoded into two or more signal layers, respectively, in a plurality of signal layers of the multiview signal.

12. The method of claim 1, wherein at least one of the texture image and the depth image is encoded based at least in part on one or more of: one or more INTRA prediction methods, one or more INTER prediction methods, or one or more INTER_VIEW prediction methods.

13. The method of claim 1, wherein the set of one or more sampled views are neighboring sampled views, among the plurality of sampled views of the multiview image, closest to the target view.

14. The method of claim 1, wherein the multiview video signal comprises a single-layer signal structure.

15. A non-transitory computer-readable storage medium storing a set of computer instructions, which when executed cause one or more computing processors to perform the method as recited in claim 1.

16. An apparatus comprising:
one or more computing processors;
a non-transitory computer-readable storage medium storing a set of computer instructions, which when executed cause the one or more computing processors to perform the method as recited in claim 1.

* * * * *